(12) United States Patent
Yang et al.

(10) Patent No.: US 11,297,492 B2
(45) Date of Patent: Apr. 5, 2022

(54) SUBSCRIBER IDENTITY PRIVACY PROTECTION AND NETWORK KEY MANAGEMENT

(71) Applicant: Apple Inc., Cupertino, CA (US)

(72) Inventors: Xiangying Yang, Cupertino, CA (US); Lijia Zhang, Beijing (CN); Dawei Zhang, Saratoga, CA (US); Huarui Liang, Beijing (CN); Shu Guo, Beijing (CN); Rohan C. Malthankar, San Jose, CA (US); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/042,859

(22) PCT Filed: Mar. 27, 2018

(86) PCT No.: PCT/CN2018/080655
§ 371 (c)(1),
(2) Date: Sep. 28, 2020

(87) PCT Pub. No.: WO2019/183794
PCT Pub. Date: Oct. 3, 2019

(65) Prior Publication Data
US 2021/0021993 A1 Jan. 21, 2021

(51) Int. Cl.
*H04L 29/06* (2006.01)
*H04W 12/02* (2009.01)
(Continued)

(52) U.S. Cl.
CPC ......... *H04W 12/02* (2013.01); *H04W 12/033* (2021.01); *H04W 12/041* (2021.01);
(Continued)

(58) Field of Classification Search
CPC ... H04W 12/02; H04W 12/40; H04W 12/041; H04W 12/0433; H04W 12/72;
(Continued)

(56) References Cited

U.S. PATENT DOCUMENTS 9,877,194 B2 * 1/2018 Schell ............... H04W 4/50
10,341,102 B2 * 7/2019 Bowman ............ H04L 9/002
(Continued)

FOREIGN PATENT DOCUMENTS

| CN | 106714139 A | 5/2017 |
|---|---|---|
| EP | 2448216 A1 | 5/2012 |
| EP | 3291481 A1 | 3/2018 |

OTHER PUBLICATIONS

International PCT Application No. PCT/CN2018/080655—International Search Report and the Written Opinion dated Jan. 2, 2019.
(Continued)

*Primary Examiner* — Mohammad A Siddiqi
(74) *Attorney, Agent, or Firm* — Dickinson Wright RLLP

(57) ABSTRACT

Techniques to protect subscriber identity in messages communicated between a user equipment (UE) and a cellular wireless network entity by using multiple ephemeral asymmetric keys are disclosed. The UE determines multiple ephemeral UE public and secret key pairs, while the cellular wireless network entity provides a network public key to the UE. The network public key may be updated over time. Multiple encryption keys based on the multiple ephemeral UE secret keys and the public network key are derived and used to encrypt a subscription permanent identifier (SUPI) to generate multiple subscription concealed identifiers (SUCIs). Each SUCI is used only once for messages commu- (Continued)

nicated to a cellular wireless network and discarded after use. New SUCI are generated when the network public key is updated.

20 Claims, 16 Drawing Sheets

(51) Int. Cl.
| | |
|---|---|
| *H04W 12/00* | (2021.01) |
| *H04W 12/04* | (2021.01) |
| *H04W 12/72* | (2021.01) |
| *H04W 12/0433* | (2021.01) |
| *H04W 12/041* | (2021.01) |
| *H04W 12/033* | (2021.01) |
| *H04W 12/40* | (2021.01) |

(52) U.S. Cl.
CPC ....... *H04W 12/0433* (2021.01); *H04W 12/40* (2021.01); *H04W 12/72* (2021.01)

(58) Field of Classification Search
CPC ..... H04W 12/033; H04W 12/75; H04W 8/16; H04L 63/0421
See application file for complete search history.

(56) References Cited

U.S. PATENT DOCUMENTS

| | | | | |
|---|---|---|---|---|
| 10,554,487 | B2* | 2/2020 | Li | ................. H04W 12/069 |
| 2017/0093565 | A1* | 3/2017 | Yang | ............... H04W 12/0433 |
| 2020/0296660 | A1* | 9/2020 | Wang | ................. H04W 48/16 |

OTHER PUBLICATIONS

European Patent application 18911605.6—Partial European Search Report dated Oct. 8, 2021.
European Patent application 18911605.6—Supplementary European Search Report dated Jan. 12, 2022. (P37075EP1).

* cited by examiner

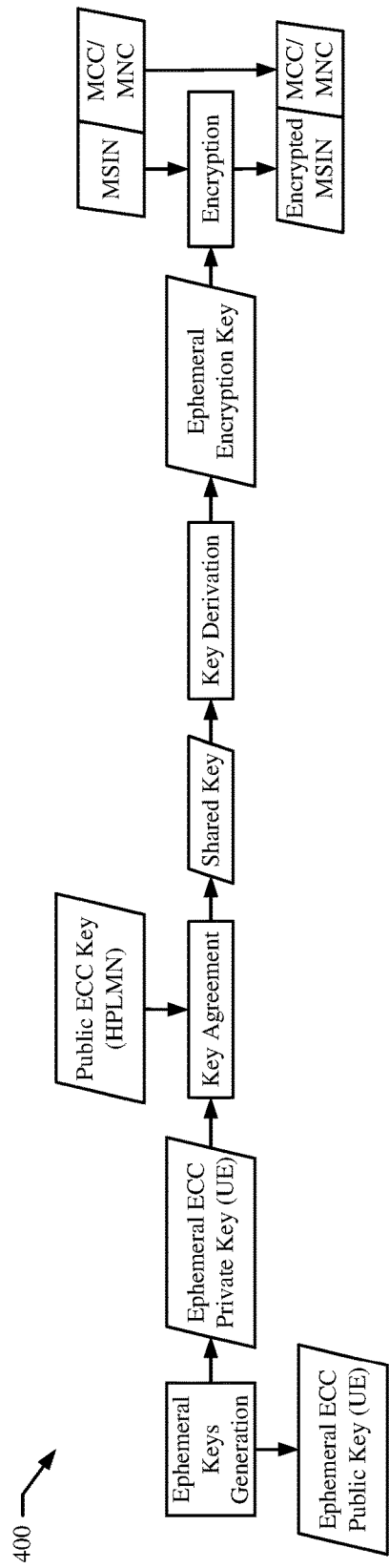
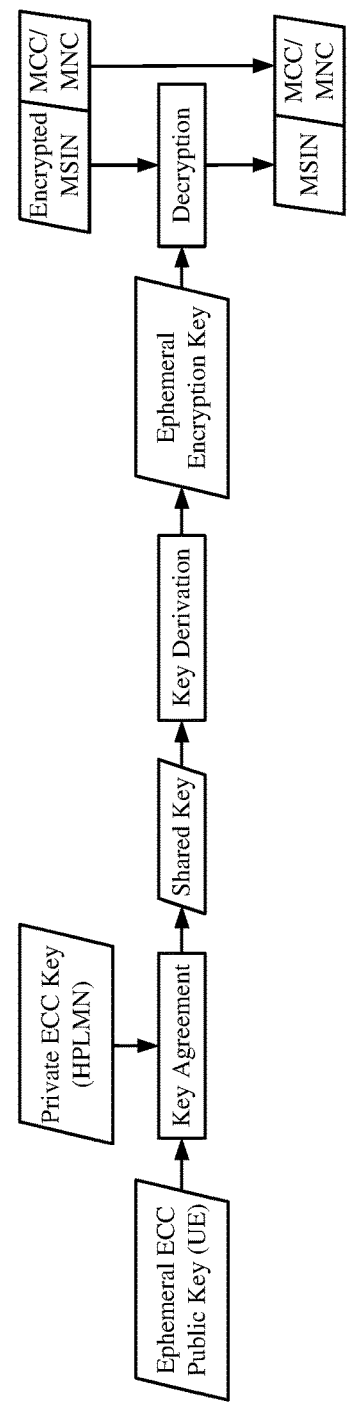
FIG. 4A (Prior Art)
FIG. 4B (Prior Art)

ID MANAGEMENT

SUBSCRIBER IDENTITY PRIVACY PROTECTION AND NETWORK KEY MANAGEMENT

CROSS-REFERENCE TO RELATED APPLICATIONS

The present application is a national phase filing of PCT Patent Application No. PCT/CN2018/080655, entitled "SUBSCRIBER IDENTITY PRIVACY PROTECTION AND NETWORK KEY MANAGEMENT," filed Mar. 27, 2018, the content of which is incorporated herein by reference in its entirety for all purposes.

FIELD

Background

Many wireless devices are configured to use removable Universal Integrated Circuit Cards (UICCs) that enable the wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. Typically, a UICC takes the form of a small removable card, (commonly referred to as a Subscriber Identity Module (SIM) card), which is configured to be inserted into a UICC-receiving bay included in a wireless device. In more recent implementations, UICCs are being embedded directly into system boards of wireless devices. These embedded UICCs (eUICCs) can provide several advantages over traditional, removable UICCs. For example, some eUICCs include a rewritable memory that can facilitate installation, modification, and/or deletion of one or more electronic SIMs (eSIMs), which can provide for new and/or different services and/or updates for accessing extended features provided by MNOs. An eUICC can store a number of MNO profiles—also referred to herein as eSIMs—and can eliminate the need to include UICC-receiving bays in wireless devices.

An MNO profile includes a globally unique subscription permanent identifier (SUPI), such as an International Mobile Subscriber Identity (IMSI), by which a user that subscribes to services provided by the MNO can be identified uniquely by cellular wireless networks. The SUPI includes a mobile country code (MCC), a mobile network code (MNC), and a Mobile Subscriber Identification Number (MSIN). Certain messages sent between the cellular wireless network and the wireless device may include the SUPI in a clear, readable, unencrypted format, and as such the SUPI is open to snooping by passive listening or active request and reply capture techniques. Encryption of the SUPI to form a subscription concealed identifier (SUCI) can mitigate snooping and can be based on asymmetric key pairs generated by a wireless device and by a wireless network entity. Asymmetric key pairs can be one-time use and/or be updated over time.

SUMMARY

Representative embodiments set forth techniques for efficiently protecting subscriber identity, by encrypting in advance a subscription permanent identifier (SUPI) to form a set of one-time use subscription concealed identifiers (SUCIs) using one-time ephemeral asymmetric keys, generated by a user equipment (UE), and network provided keys. The UE generates sets of one-time ephemeral UE public and secret key pairs and one-time encryption keys based on the one-time ephemeral UE secret keys and a network public key. The UE encrypts a mobile subscriber identifier, such as an MSIN portion of a SUPI, using the one-time encryption keys to generate the set of one-time use SUCIs. The UE stores the one-time use SUCIs with corresponding one-time ephemeral UE public keys. To authenticate with a cellular wireless network, the UE sends an uplink (UL) message to a cellular wireless network entity, such as to an evolved NodeB (eNodeB) or to a next generation NodeB (gNB). The UL message includes a one-time SUCI, a corresponding one-time ephemeral UE public key, and an identifier for a network public key used to encrypt the SUCI. The cellular wireless network entity can validate the network public key and decrypt the SUCI by deriving the encryption key using the one-time ephemeral UE public key and a network secret key that corresponds to the validated network public key. For subsequent authentications, the UE sends UL messages that include different one-time SUCIs, corresponding one-time ephemeral UE public keys, and the network public key identifier. When the network public key is updated, e.g., by an over the air (OTA) update to the UE and/or by a downlink (DL) message sent to the UE by a network entity, e.g., by the cellular wireless network entity or by a third-party server providing carrier bundle updates, previously generated unused one-time SUCIs are discarded. Additional new one-time SUCIs are generated based on newly derived encryption keys based on updated network public key and additional one-time ephemeral UE secret keys. In some embodiments, the UE retains previously generated, unused ephemeral UE secret keys and discards them only when associated one-time SUCIs are used. An unused ephemeral UE secret key can be reused to derive a new encryption key based on an updated network public key. When no unused ephemeral UE secret keys are available, the UE generates additional one-time ephemeral key pairs with which to derive new one-time encryption keys. In some embodiments, the UE generates one-time encryption keys based on an elliptic curve Diffie-Hellman (ECDH) key agreement protocol. In some embodiments, network public keys are maintained by a secure element (SE) of the UE, e.g., an embedded Universal Integrated Circuit Card (eUICC) and/or a Subscriber Identity module (SIM) card. In some embodiments, network public keys are maintained by processing circuitry external to an SE of the UE. In some embodiments, a cellular wireless network entity updates a network public key maintained by an SE of the UE by sending an OTA update to the SE. In some embodiments, a third-party server provides a carrier bundle update to the processing circuitry external to the SE of the UE, the carrier bundle update including one or more updated network public keys for one or more cellular wireless networks. In some embodiments, before sending to a cellular wireless network entity an UL message that includes a SUCI, the UE determines whether to use SUCIs encrypted with a network public key maintained by the SE or SUCIs encrypted with a network public key maintained by processing circuitry external to the SE. In some embodiments, when both the SE and the processing circuitry external to the SE maintain network public keys separately, the UE determines which network public key to use for encryption of the SUPI based on one or more of: a device-based policy or a network-based policy. In some embodiments, the network-based policy and/or the device-based policy require use of a network public key maintained by the SE to be prioritized over a network public key maintained by processing circuitry external to the SE. In some embodiments, the device-based policy and/or the network-based policy requires use of a most recent network public key, such as based on a time stamp and/or a revision indicator. In some embodiments, the device-based policy and/or the network-based policy requires using available network public keys maintained by the SE or by the processing circuitry external to the SE until one is accepted by the wireless network. In some embodiments, the device-based policy and/or the network-based policy requires sending an unencrypted SUPI rather than an encrypted SUCI to the wireless network when no network public keys are available or when no available network public key enables successful authentication with the wireless network.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 4A and 4B illustrate flow diagrams of a prior art encryption technique to protect a subscriber identity.

DETAILED DESCRIPTION

Figure 1:
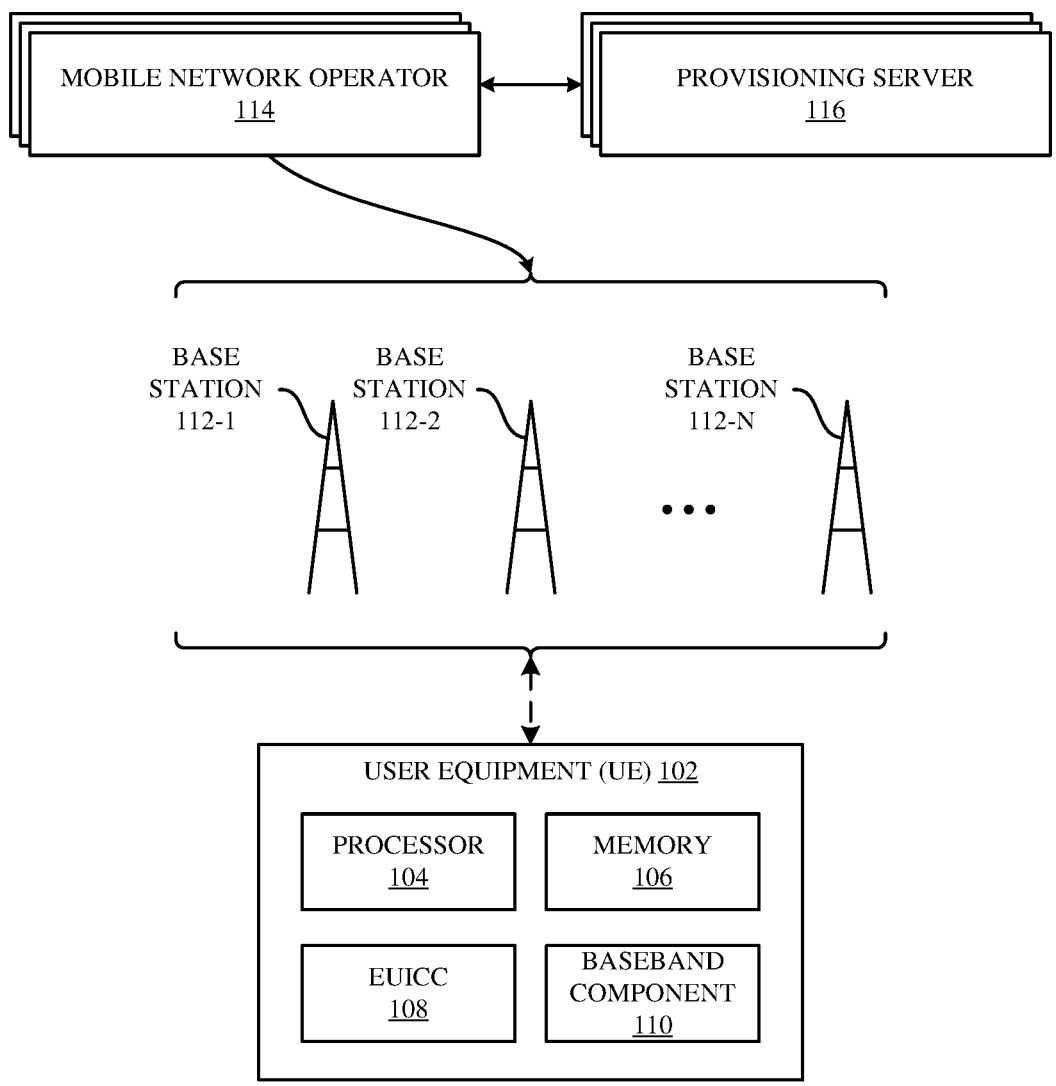
FIG. 1 illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that some UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments described herein set forth techniques for efficiently protecting subscriber identity in messages communicated between a wireless device and a cellular wireless network entity by generating sets of encrypted subscriber identities in advance based on one-time use encryption keys derived from a network public key and one-time use, ephemeral user equipment (UE) secret keys. When a network public key is updated, the UE regenerates new one-time use encryption keys based on the updated network public key and unused one-time use, ephemeral UE secret keys. The UE can maintain network public keys in a secure element (SE) based on over-the-air (OTA) updates received from a cellular wireless network entity. The UE can also maintain network public keys in processing circuitry external to the SE based on carrier update bundles received securely from a third-party server.

In some embodiments, a cellular wireless network entity, such as an evolved NodeB (eNodeB or eNB) or next generation Node (gNodeB or gNB), is configured with a network public key and a network secret key, while the wireless device, such as a user equipment (UE), is also configured with the network public key. The UE generates a set of one or more one-time use, ephemeral UE public key and ephemeral UE secret key pairs and derives a set of one or more one-time use encryption keys based on the one-time use, ephemeral UE secret keys and the network public key. The UE encrypts a mobile subscriber identifier of a subscription permanent identifier (SUPI), e.g., a mobile subscriber identification number (MSIN) portion of an International Mobile Subscriber Identity (IMSI), using the one-time use encryption keys to form a set of one-time use subscription concealed identifiers (SUCIs). The UE can store the one-time use encryption keys and associated one-time use, ephemeral UE public keys for subsequent authentication with a cellular wireless network entity of the cellular wireless network that provided the network public key. When authentication (or other messages that require secure identification of the UE) with a cellular wireless network is required, such as when initiating a network attachment, the UE sends to the cellular wireless network entity an uplink (UL) message that includes one of the one-time use SUCIs and the associated one-time use, ephemeral UE public key as well as an identifier for the network public key. The cellular wireless network entity can verify the network public key used for encryption of the SUCI, and when the network public key is validated, decrypt the SUCI by generating an encryption key using the one-time, use ephemeral UE public key included in the UL message and a network secret key associated with the network public key that was validated. For subsequent authentications, the UE sends UL messages that include different one-time SUCIs, corresponding one-time user, ephemeral UE public keys, and the network public key identifier.

When the network public key is updated, e.g., by an over the air (OTA) update to the UE and/or by a downlink (DL) message sent to the UE by the cellular wireless network entity, previously generated unused one-time SUCIs are discarded. Additional new one-time SUCIs are generated based on newly derived encryption keys based on updated network public key and additional one-time ephemeral UE secret keys. In some embodiments, the UE retains previously generated, unused ephemeral UE secret keys and discards them only when associated one-time SUCIs are used. An unused ephemeral UE secret key can be reused to derive a new encryption key based on an updated network public key. When no unused ephemeral UE secret keys are available, the UE generates additional one-time ephemeral key pairs with which to derive new one-time encryption keys. The one-time encryption keys can be derived as Advanced Encryption Standard (AES) keys. In some embodiments, the UE generates one-time encryption keys based on an elliptic curve Diffie-Hellman (ECDH) key agreement protocol.

In some embodiments, network public keys are maintained by a secure element (SE) of the UE, e.g., an embedded Universal Integrated Circuit Card (eUICC) and/or a Subscriber Identity module (SIM) card. In some embodiments, network public keys are maintained by processing circuitry external to an SE of the UE. In some embodiments, a cellular wireless network entity updates a network public key maintained by an SE of the UE by sending an OTA update to the SE. In some embodiments, a third-party server provides a carrier bundle update to the processing circuitry external to the SE of the UE, the carrier bundle update including one or more updated network public keys for one or more cellular wireless networks. In some embodiments, before sending to a cellular wireless network entity an UL message that includes a SUCI, the UE determines whether to use SUCIs encrypted with a network public key maintained by the SE or SUCIs encrypted with a network public key maintained by processing circuitry external to the SE. In some embodiments, when both the SE and the processing circuitry external to the SE maintain network public keys separately, the UE determines which network public key to use for encryption of the SUPI based on one or more of: a device-based policy or a network-based policy. In some embodiments, the network-based policy and/or the device-based policy require use of a network public key maintained by the SE to be prioritized over a network public key maintained by processing circuitry external to the SE. In some embodiments, the device-based policy and/or the network-based policy requires use of a most recent network public key, such as based on a time stamp and/or a revision indicator. In some embodiments, the device-based policy and/or the network-based policy can require using available network public keys maintained by the SE or by the processing circuitry external to the SE until a SUCI encrypted with one of the available network public keys is accepted by the wireless network or all available network public keys have been attempted. In some embodiments, the device-based policy and/or the network-based policy can require sending an unencrypted SUPI rather than an encrypted SUCI to the wireless network when no network public keys are available or when no available network public key enables successful authentication with the wireless network. In some embodiments, when authentication with the wireless is not successful using encrypted SUCIs based on available network public keys, the LIE may report an error condition, such as via an interface of the UE.

In some embodiments, DL messages sent from a cellular wireless network entity to the UE include network public keys with accompanying signatures to use for verification of the DL messages. In some embodiments, DL messages sent from the cellular wireless network entity to the UE include network public keys without signatures for verification. In some embodiments, UL messages sent from the UE to the cellular wireless network entity include a network key identifier to allow the cellular wireless network entity to ascertain the network public key used by the UE to generate the encryption key.

In some embodiments, network public keys (and corresponding network secret keys) can be rotated over time, such as by providing an over the air (OTA) update using a secure communication channel from the cellular wireless network entity to the UE. In some embodiments, use of network key pairs and updated network key pairs can overlap for a limited period of time. Thus, in some embodiments, a previous network key pair can be used for a limited period of time by the UE after receipt of a new updated network key pair. Either the previous "old" network key pair or the "new" network key pair can be used during the overlapping limited period of time. This allows for rotation of the network key pairs with robustness, as a failure of communication of the newest network key pair can be corrupted in transit and require retransmission or the UE can fail during processing and thus not properly receive and update the network key pair.

These and other embodiments are discussed below with reference to FIGS. 1 through 11; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a user equipment (UE) 102, a group of base stations 112-1 to 112-n that are managed by different Mobile Network Operators (MNOs) 114, and a set of provisioning servers 116 that are in communication with the MNOs 114. The UE 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the UE 102, and the MNOs 114 can represent different wireless service providers that provide specific services (e.g., voice and data) to which the UE 102 can be subscribed.

As shown in FIG. 1, the UE 102 can include processing circuitry, which can include a processor 104 and a memory 106, an embedded Universal Integrated Circuit Card (eUICC) 108, and a baseband component 110. In some embodiments, the UE 102 includes one or more physical Subscriber Identity Module (SIM) cards (not shown) in addition to or substituting for the eUICC. The components of the UE 102 work in conjunction to enable the UE 102 to provide useful features to a user of the UE 102, such as localized computing, location based services, and Internet connectivity. The eUICC 108 can be configured to store multiple electronic SIMs (eSIMs) for accessing different MNOs 114 through the base stations 112-1 to 112-n. For example, the eUICC 108 can be configured to store and manage one or more eSIMs for one or more MNOs 114 for different subscriptions to which the UE 102 is associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 102, the MNOs 114, third party entities, and the like. Communication of eSIM data between a provisioning server 116 and the eUICC 108 (or between the provisioning server 116 and processing circuitry of the UE 102 external to the eUICC 108, e.g., the processor 104) can use a secure communication channel.

Figure 2:
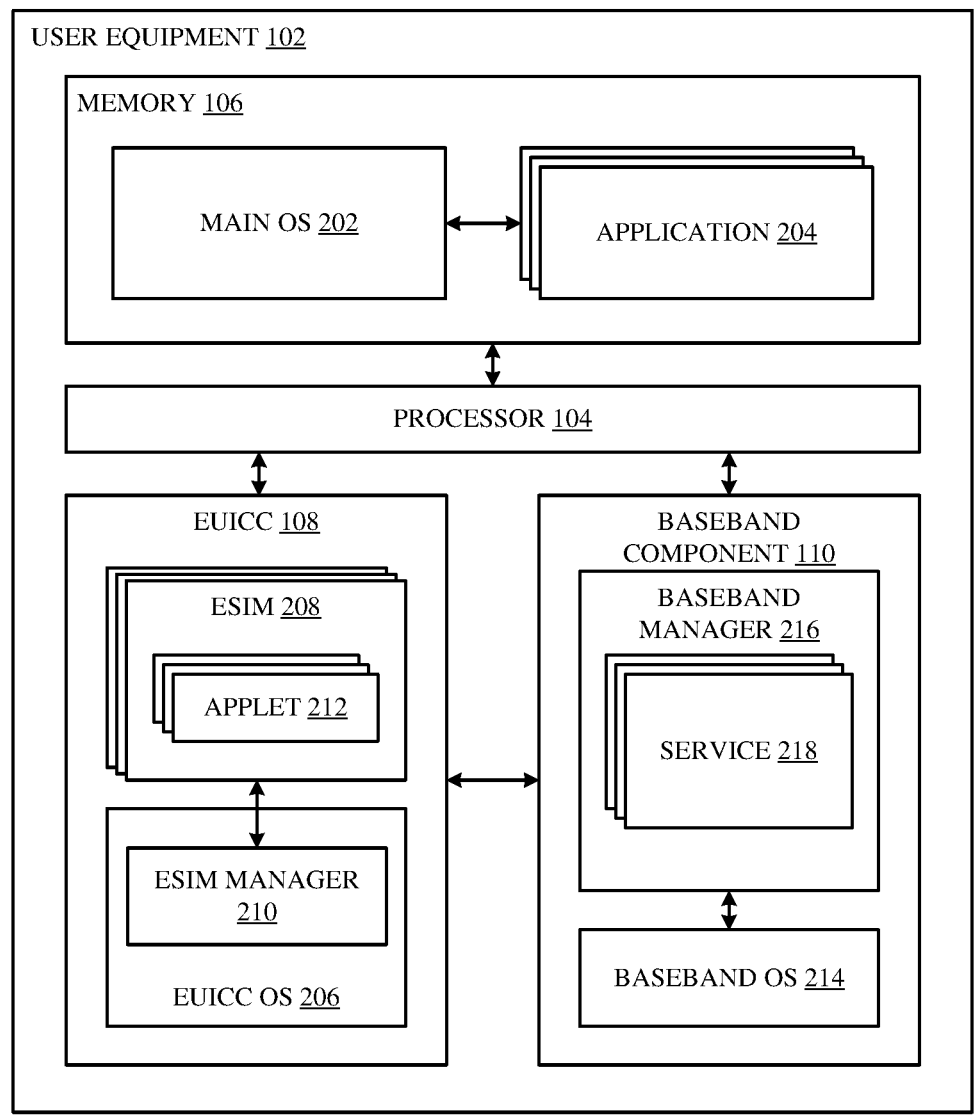
FIG. 2 illustrates a block diagram of a more detailed view of exemplary components of the system of FIG. 1, according to some embodiments.

FIG. 2 illustrates a block diagram of a more detailed view 200 of particular components of the UE 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the UE 102. The eUICC 108 OS can include an eSIM manager 210, which can perform management functions for various eSIMs. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the UE 102 to communicate with an MNO 114 and provide useful features (e.g., phone calls and internet) to a user of the UE 102.

As also shown in FIG. 2, the baseband component 110 of the UE 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the UE 102 and MNOs 114 according to the different eSIMs 208 that are enabled within the eUICC 108.

Figure 3:
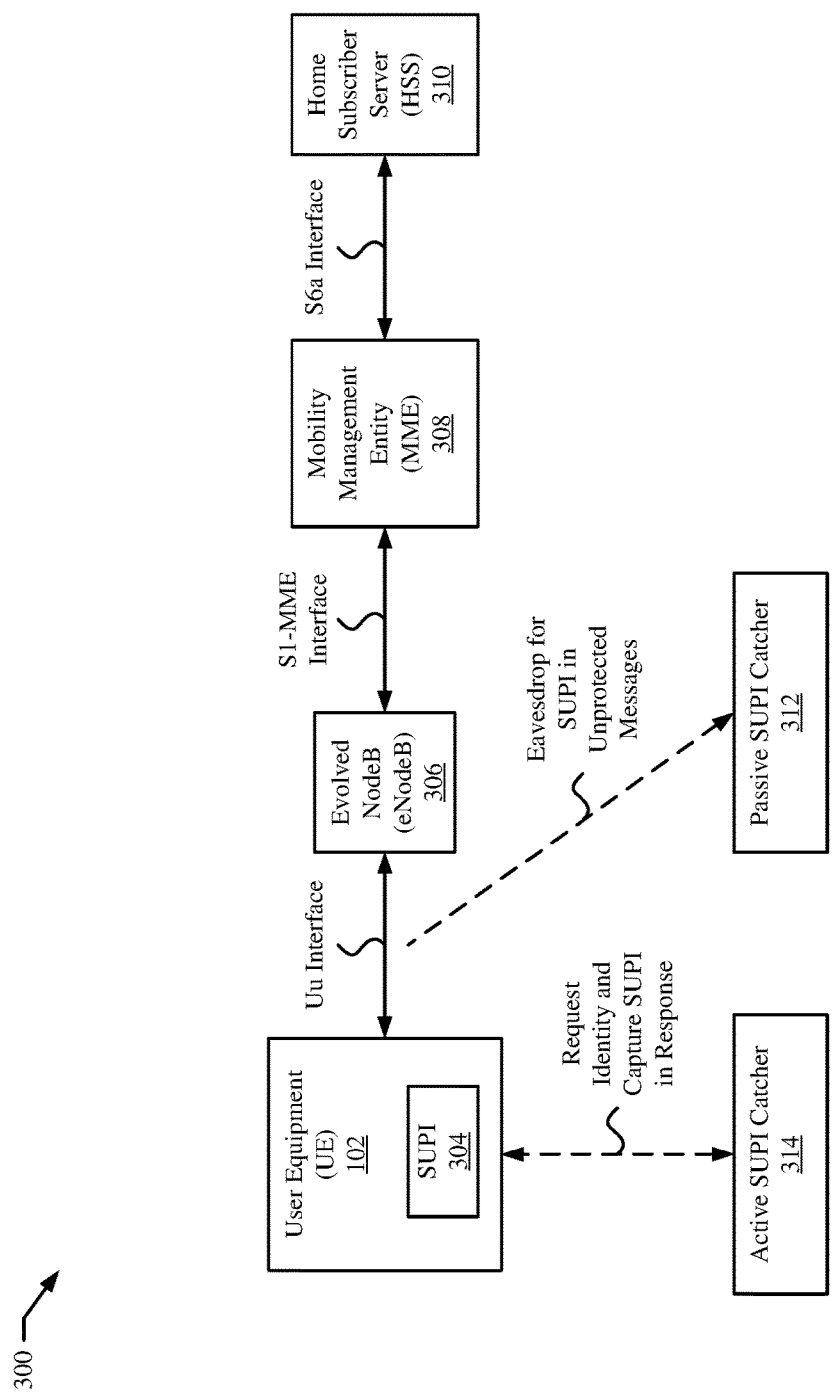
FIG. 3 illustrates a block diagram of an exemplary system subject to capture of subscriber identities, according to some embodiments.

FIG. 3 illustrates a block diagram 300 of an exemplary system subject to capture of subscriber identities. The system includes a UE 102, which includes an unencrypted subscription permanent identifier (SUPI) 304 by which a subscription for a user of the UE 102 can be uniquely identified, in communication with an exemplary cellular wireless network entity, namely an evolved NodeB (eNodeB) 306. An example of a SUPI 304 includes an international mobile subscriber identity (IMSI). The UE 102 and the eNodeB 306 can communicate via a Uu interface, which for some messages or for certain periods of time, such as prior to establishment of a secure connection between the UE 102 and the eNodeB 306, can be subject to eavesdropping by a third party. While the eNodeB 306 connects to a Mobility Management Entity (MME) 308 of the core network via a secure S1-MME interface, and the MME 308 connects to a Home Subscriber Server (HSS) 310 via a secure S6a interface, the eNodeB 306 can send some messages to and receive some messages from the UE 102 "in the clear", in some instances. For example, a Radio Resource Control (RRC) paging message sent from the eNodeB 306 to the UE 102 can include the SUPI 304 of the UE 102 in an unprotected manner. Similarly, certain RRC network access stratum (NAS) messages send from the UE 102 to the eNodeB 306 can also include the SUPI 304 of the UE 102 without using encryption to protect the SUPI 304 from eavesdroppers. Example RRC NAS messages include an RRC Attach Request message, a UE originating RRC Detach Request message, and an RRC Identity Response message. A passive eavesdropping entity, such as passive SUPI catcher 312, can listen for communication sent from the eNodeB 306, such as paging messages, or sent from the UE 102, such as attach/detach request messages, and ascertain the SUPI 304 of the UE 102. In addition an active eavesdropping entity, such as active SUPI catcher 314, can mimic communication from the eNodeB 306 and send a Request Identity message to the UE 102 and receive an Identity Response message that includes the SUPI 304 of the UE 102. The Uu interface between the UE 102 and the eNodeB 306 is susceptible to SUPI exposure due to passive and/or active attacks. By having the UE 102 and the eNodeB 306 securely encrypt at least a portion of the SUPI 304, such as the mobile subscriber identification number (MSIN), when communicating over an insecure communication link, the SUPI 304 can be protected from eavesdropping. Moreover, with the use of one-time use, ephemeral public/secret key pairs, the SUPI 304 can be protected from future decryption should a previously used secret key be compromised.

The techniques presented herein can apply to any messages that include a globally unique mobile subscriber identifier that is communicated between the UE 102 and a cellular wireless network entity, including over insecure connections susceptible to eavesdropping. Examples of a wireless network entity include a radio access network entity, such as the eNodeB 306 or a next generation NodeB (also referred to as a gNodeB or gNB), or a core network entity, such as the MME 308, the HSS 310, an authentication server function (AUSF), or an access and mobility function (AMF). The messages may include a mobile subscriber identifier, such as the MSIN of the SUPI 304, which can be encrypted securely to protect privacy of the mobile subscriber identifier. An encrypted version of the SUPI 304 can be referred to as a subscription concealed identifier (SUCI).

FIGS. 4A and 4B illustrate flow diagrams 400/450 of a prior art encryption technique to protect a subscriber identity. For the UE side encryption flow diagram 400, the UE 102 generates ephemeral key pairs, which include an ephemeral UE public key that can be provided to another party, such as to a cellular wireless network side entity, e.g., the eNodeB 306, and an ephemeral UE private key (which can also be referred to as a secret key). Based on a key agreement, which both the UE 102 and the cellular wireless network entity know, the UE 102 can generate a shared key (which can also be referred to as a shared secret) based on ephemeral UE private key and a public network key (also referred as a public ECC key for the Home Public Land Mobile Network or HPLMN). Similarly, the cellular wireless network entity, e.g., the eNodeB 306, can generate the shared key based on the key agreement using the ephemeral UE public key provided by the UE 102 to the cellular wireless network entity and a private (secret) network key that corresponds to the public network key known to the UE 102. The UE 102 and the cellular wireless network entity can use a common key derivation technique to determine an ephemeral encryption key with which to encrypt (to form a SUCI from the SUPI 304) and to decrypt (to recover the SUPI 304 from the SUCI). In some embodiments, the MSIN portion of the SUPI 304 is encrypted while the MCC/MNC portion of the SUPI 304 can remain unencrypted. Both the UE side encryption and the network side encryption can be based on an Elliptic Curve Integrated Encryption Scheme (ECIES). The encryption technique illustrated in FIGS. 4A and 4B can be based on static network public and private (secret) keys and as such, should the static network private key be compromised, previous communications that include the SUPI encrypted with the static network public key can be decrypted. Changing network public keys over time can overcome this deficiency.

Figure 5A:
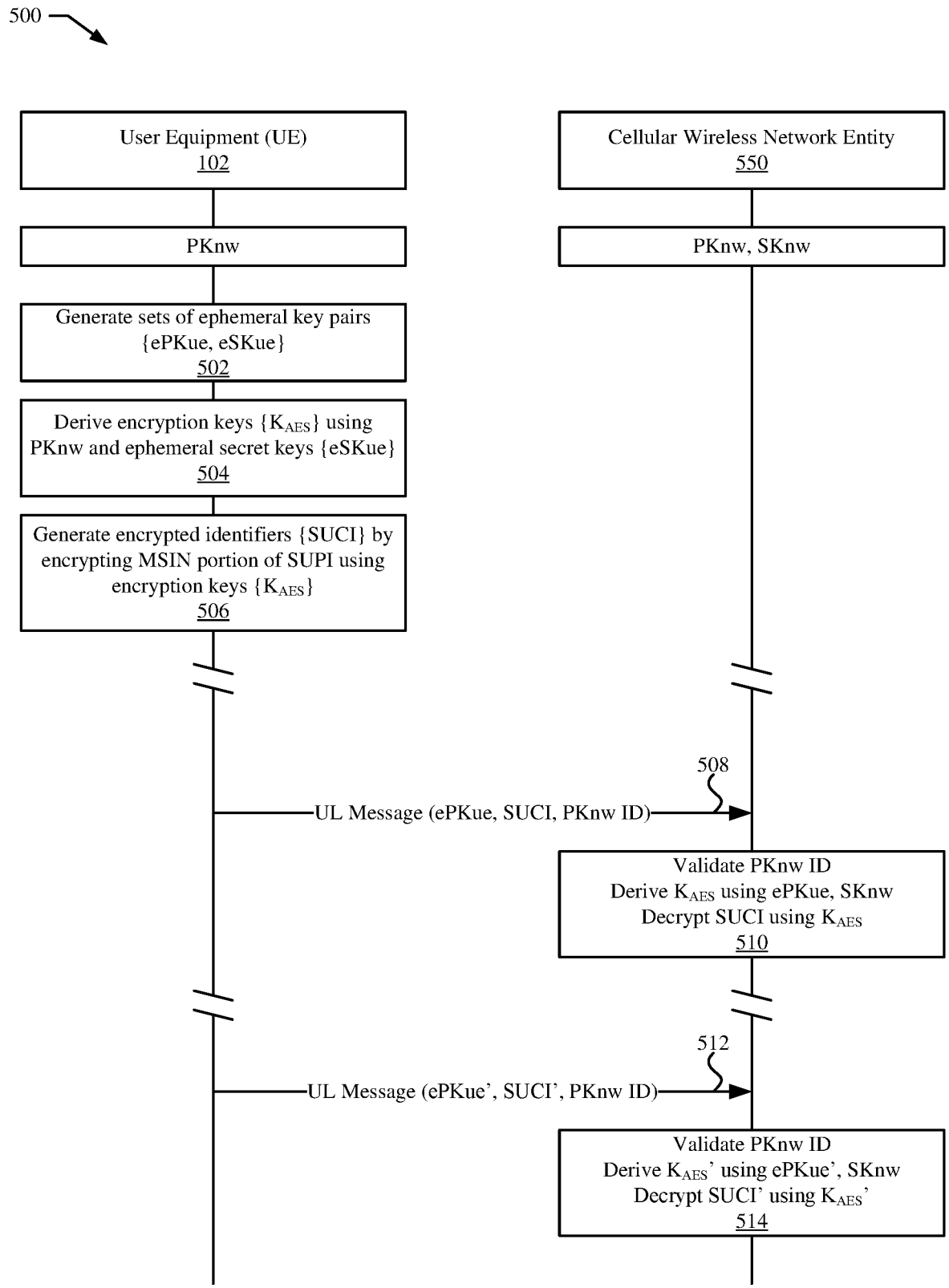
FIG. 5A illustrates an exemplary message exchange using subscriber identities encrypted in advance to protect the privacy of a subscriber identity, according to some embodiments.

FIG. 5A illustrates an exemplary message exchange 500 to generate encrypted subscriber identities in advance to use when communicating messages to protect the privacy of a subscriber identity, according to some embodiments. Initially, the UE 102 can be configured with a network public key (PKnw), while a cellular wireless network entity 550 can be pre-configured with a corresponding network secret key (SKnw) and the PKnw. (Note that the term "secret key" is used herein synonymously for the term "private key"). The PKnw can be communicated to the UE 102 via a secure communication channel with a cellular wireless network entity, such as between the UE 102 and a provisioning server 116, or between the UE 102 and the HSS 310, or between the UE 102 and another network-based server, including in some embodiments, a third-party server (not shown). In some embodiments, the UE 102 obtains the PKnw in conjunction with an eSIM 208 (or with a SIM of a physical UICC).

At 502, the UE 102 can generate multiple sets of ephemeral key pairs, each ephemeral key pair including an ephemeral UE public key (ePKue) and a corresponding ephemeral UE secret key (eSKue). The UE 102 pre-generates the ephemeral UE key pairs {ePKue, eSKue} to reduce processing time when later authenticating with a wireless network entity using encrypted versions of subscriber identities, e.g., using SUCIs, rather than generating the ephemeral key pairs, encryption keys, and encrypted identities during authentication with the wireless network. At 504, the UE 102 derives encryption keys, e.g., Advanced Encryption Standard (AES) encryption keys ($K_{AES}$) using the UE-generated eSKue and the cellular wireless network provided public key PKnw. At 506, the UE 102 generates a set of encrypted subscriber identifiers, namely a set of SUCIs from a SUPI 304, by encrypting a mobile subscriber identifier, such as the MSIN portion of the SUPI 304 of the UE 102 using the encryption keys $K_{AES}$. The UE 102 can store the encrypted SUCIs and associated ephemeral public keys ePKue for later communication in messages to the cellular wireless network entity 550, such as during an attachment procedure that requires authentication with a cellular wireless network. In some embodiments, the UE 102 discards the ephemeral secret keys eSKue after encrypting the SUCIs. In some embodiments, the UE 102 retains the ephemeral secret keys eSKue to reuse if the network public key PKnw changes, discarding the ephemeral secret key eSKue associated with a SUCI once the SUCI is used. In some embodiments, the UE 102 discards the encryption keys $K_{AES}$ after encrypting the SUCIs.

At 508, the UE 102 sends to the cellular wireless network entity 450 a first uplink (UL) message that includes one of the SUCIs, an ephemeral UE public key ePKue associated with the ephemeral UE secret key eSKue used to encrypt the one of the SUICs, and an identifier for the network public key, e.g., PKnw ID, to indicate the network public key used for key encryption of the SUCI. In some embodiments, the PKnw ID is a hash of the PKnw or a count value, where the cellular wireless network entity 550 can ascertain which network public key $PK_{nw}$ the UE 102 used to generate the encryption key $K_{AES}$ with which the SUPI was encrypted to form the SUCI. In some embodiments, each SUCI is used only once, and the UE 102 discards the SUCI and associated ephemeral keys, e.g., eSKue and ePKeu, after including the SUCI in an UL message.

At 510, the cellular wireless network entity 550 validates the public network key PKnw based on the identifier PKnw ID received in the UL message, and when validated, the cellular wireless network entity 550 derives the encryption key $K_{AES}$ using the ephemeral UE public key ePKue received from the UE 102 and a secret network key SKnw associated with the public network key PKnw and known by the cellular wireless network entity 550. The cellular wireless network entity 550 decrypts the SUCI using the derived encryption key $K_{AES}$. In some embodiments, the actions performed by the cellular wireless network entity can be performed in a different order, e.g., the cellular wireless network entity 550 can derive the encryption key $K_{AES}$ using the ephemeral UE public key ePKue provided by the UE 102 in the UL message and a secret network key SKnw known to be valid, and decrypts the SUCI using the generated encryption key $K_{AES}$. If the SUCI decryption fails to produce a valid SUPI, the cellular wireless network entity 550 can check the public network key identifier PKnw ID to determine if the UE 102 is using an outdated public network key PKnw.

At 512, the UE 102 sends to the cellular wireless network entity 450 a second uplink (UL) message that includes a second one of the SUCIs, indicated as SUIC', a second ephemeral UE public key indicated as ePKue' associated with a second ephemeral UE secret key eSKue' used to encrypt the SUPI to generate the second one of the SUCIs, and the identifier for the network public key, e.g., PKnw ID. The previous SUCI was used only once, and thus any compromise of the previous SUCI does not affect the security of the current SUCI, as each SUCI is encrypted using one-time ephemeral UE secret keys eSKue.

At 514, the cellular wireless network entity 550 validates the PKnw ID, and when validated, derives a second encryption key $K_{AES}$' using the second ephemeral UE public key ePKue' and the network secret key SKnw. The cellular wireless network entity 550 can then decrypt the SUCI' using $K_{AES}$' to recover the SUPI. The UE 102 can pre-generate encrypted SUCIs and use them for UL messages as long as the public network key PKnw used for generated the encryption keys $K_{AES}$ remains valid. If the public network key PKnw is updated, then unused SUCIs can be discarded and new SUCIs generated based on the updated PKnw as described further herein.

Figure 5B:
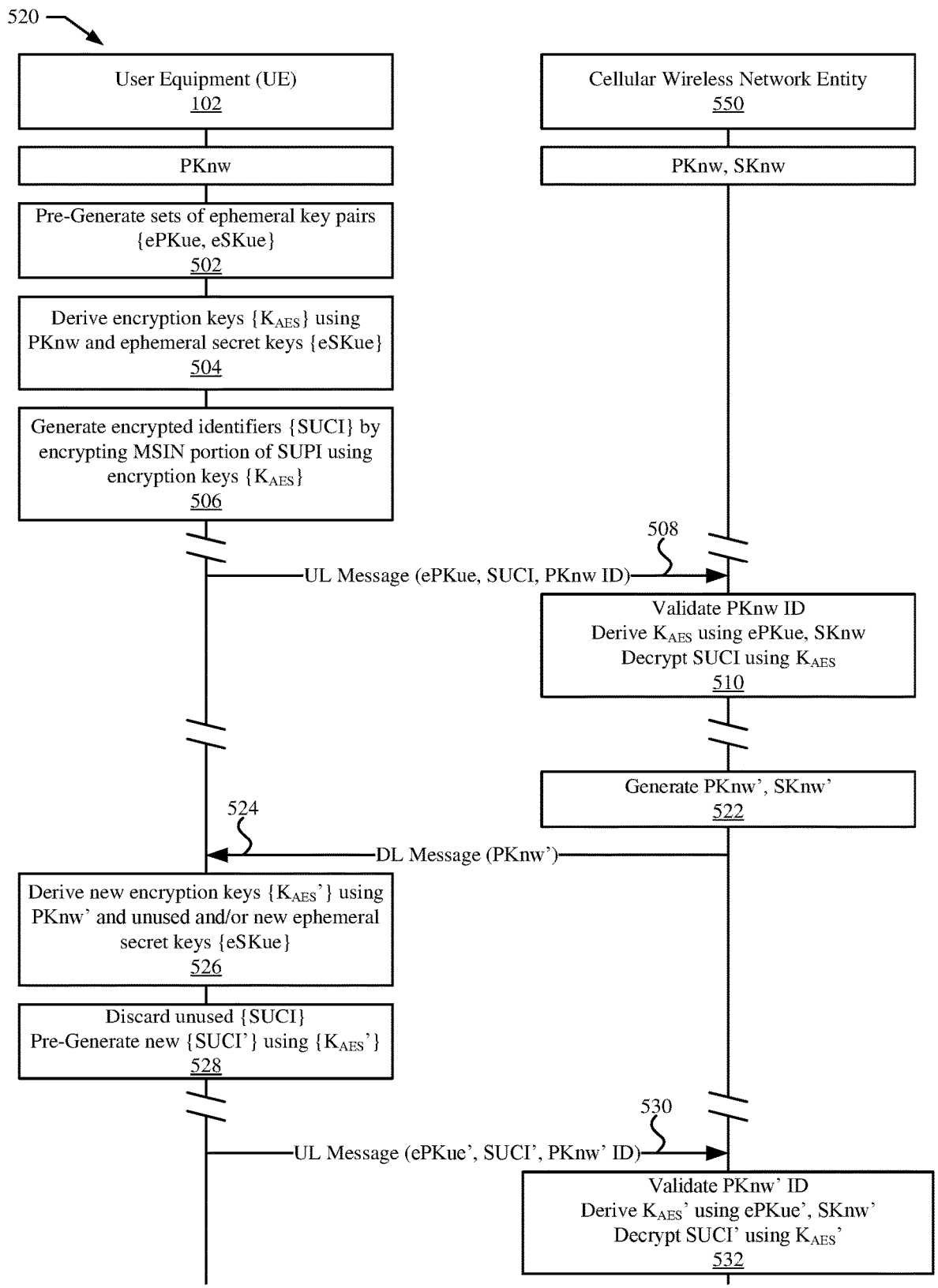
FIG. 5B illustrates an exemplary message exchange to protect the privacy of a subscriber identity including updating encrypted subscriber identities, according to some embodiments.

FIG. 5B illustrates an exemplary message exchange 520 to protect the privacy of a subscriber identity including updating encrypted subscriber identities in response to a change in a network public key, according to some embodiments. As in FIG. 5A, at 502, the UE 102 pre-generates a set of ephemeral key pairs {ePKue, eSKue} and, at 504, derives a set of encryption keys {$K_{AES}$} based on a current public network key PKnw and the set of ephemeral secret keys {eSKue}. At 506, the UE 102 generates a set of encrypted subscription identifiers {SUCI} from a permanent subscription identifier SUPI of the UE 102, e.g., by encrypting an MSIN portion of the SUPI using the set of encryption keys {$K_{AES}$}, where each encryption key $K_{AES}$ can be used to generate a unique, encrypted, one-time use SUCI from the permanent subscription identifier SUPI of the UE 102. At 508, the UE 102 communicates an UL message to the cellular wireless network entity 550, such as for authentication to attach to a wireless network or to provide a location area update to the wireless network, where the UL message includes one of the encrypted SUCIs along with an associated ephemeral UE public key ePKue and an identifier for a network public key PKnw. At 510, the cellular wireless network entity 550 validates the network public key PKnw used by the UE 102 based on the identifier PKnw ID and when validated derives an encryption key $K_{AES}$ using the ephemeral UE public key ePKue from the UL message and a secret network key SKnw that corresponds to the network public key PKnw. At 510, the cellular wireless network entity 550 can then decrypt the SUCI from the UL message using the derived encryption key $K_{AES}$ to obtain the SUPI.

At 522, the cellular wireless network entity 550 generates a new network key pair {PKnw', SKnw'}. At 524, the cellular wireless network entity 550 sends a downlink (DL) message to the UE 102 that provides an updated public network key PKnw' from the newly generated network key pair {PKnw', SKnw'}. In some embodiments, the cellular wireless network entity 550 generates multiple network key pairs {PKnw, SKnw} in advance and selects new key pairs to replace older key pairs over time. At 526, the UE 102 derives a new set of encryption keys {$K_{AES}$'} based on the new public network key PKnw' and any unused and/or new ephemeral secret keys {eSKue}. In some embodiments, the UE 102 derives new ephemeral secret keys {eSKue'}, such as when previous unused ephemeral secret keys {eSKue} were discarded after being used for generation of a previous set of encryption keys {$K_{AES}$}, and uses the new ephemeral secret keys {eSKue'} with the new public network key PKnw' to generate the new set of encryption keys {$K_{AES}$'}. At 528, the UE 102 discards any unused previously generated encrypted subscription concealed identifiers {SUCI} and pre-generates and new set of encrypted subscription concealed identifiers {SUCI'} from the SUPI of the UE 102 and using the new set of encryption keys {$K_{AES}$'}. The new set of {SUCI'} can replace the previous set of {SUCI} when sending messages to a wireless network entity, such as for authentication. At 530, the UE 102 sends an UL message to the cellular wireless network entity 550, the UL message including one of the {SUCI'}, the ephemeral UE public key ePKue' associated with the ephemeral UE secret key eSKue' used to generate the encryption key $K_{AES}'$ that was used to encrypt the SUCI' and an identifier PKnw' ID for the network public key PKnw' also used to generate the encryption key $K_{AES}'$. At 532, the cellular wireless network entity 550 validates the network public key PKnw' used by the UE 102 based on the identifier PKnw' ID and when validated derives an encryption key $K_{AES}'$ using the ephemeral UE public key ePKue' extracted from the UL message and a secret network key SKnw' that corresponds to the network public key PKnw'. The cellular wireless network entity 550 can then decrypt the SUCI' from the UL message using the derived encryption key $K_{AES}'$ to obtain the SUPI.

Figure 5C:
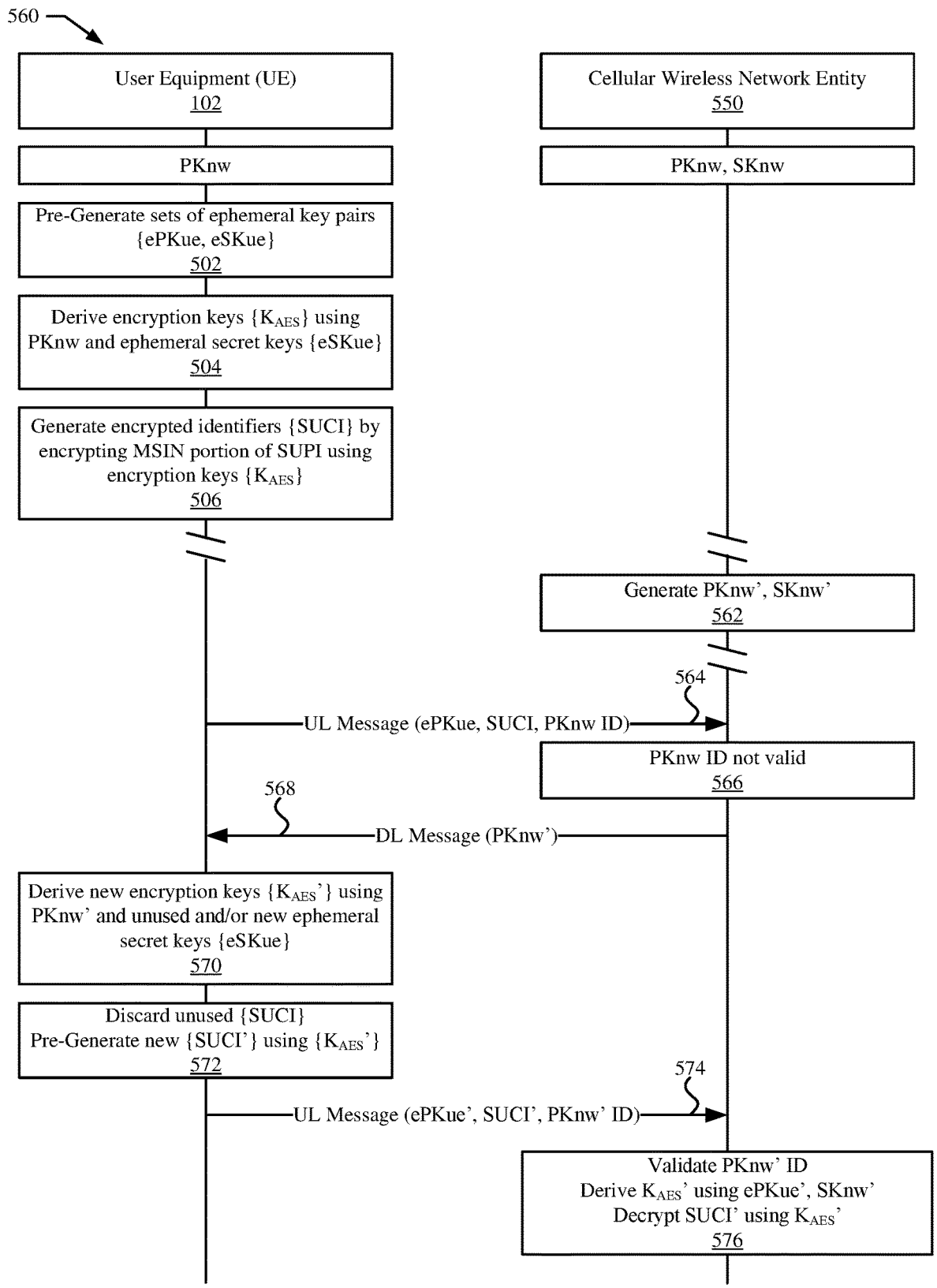
FIG. 5C illustrates another exemplary message exchange to protect the privacy of a subscriber identity including updating encrypted subscriber identities, according to some embodiments.

FIG. 5C illustrates another exemplary message exchange 560 to protect the privacy of a subscriber identity including updated encrypted subscriber identities based on a change in a network public key, according to some embodiments. As in FIGS. 5A and 5B, initially, the UE 102 can be configured with a network public key (PKnw), while the cellular wireless network entity 550 can be pre-configured with a corresponding network secret key (SKnw) and the PKnw. The UE 102 pre-generates a set of ephemeral key pairs {ePKue, eSKue} and, at 504, derives a set of encryption keys $\{K_{AES}\}$ based on a current public network key PKnw and the set of ephemeral secret keys {eSKue}. At 506, the UE 102 generates a set of encrypted subscription identifiers {SUCI} from a permanent subscription identifier SUPI of the UE 102, e.g., by encrypting an MSIN portion of the SUPI using the set of encryption keys $\{K_{AES}\}$, where each encryption key $K_{AES}$ can be used to generate a unique, encrypted, one-time use SUCI from the permanent subscription identifier SUPI of the UE 102. The UE 102 can store the set of {SUCI} for use in future UL messages. At 562, the cellular wireless network entity 550 generates a new network key pair {PKnw', SKnw'}. Unlike in FIG. 5B, however, the UE 102 can be unaware of the new network public key PKnw'. For example, communication of the new network public keypair PKnw' to the UE 102 can be corrupted or otherwise fail, and as such, the UE 102 continues to use the set of {SUCI} generated based on the previous network public key PKnw. At 564, the UE 102 communicates an UL message to the cellular wireless network entity 550, such as for authentication to attach to a wireless network or to provide a location area update to the wireless network, where the UL message includes one of the encrypted SUCIs along with an associated ephemeral UE public key ePKue and the identifier PKnw ID for the network public key PKnw. At 566, the cellular wireless network entity 550 can determine that the network public key identifier PKnw ID is not valid, as the more recently generated key pair {PKnw', SKnw'} can supersede use of the previously generated key pair {PKnw, SKnw}. In some embodiments, key pairs are associated with validity time periods, which may overlap for a limited period of time between successively generated key pairs to allow for updating. For the message exchange 560 of FIG. 5C, the previously generated key pair {PKnw, SKnw} may no longer be valid, e.g., when the validity time period has elapsed. As the network public key PKnw used by the UE 102 for encryption of the SUCI is no longer valid, the cellular wireless network entity can discard the UL message and provide an update to the UE 102, e.g., via a DL message at 568, the DL message including an indication of the updated public key PKnw'. In response to receipt of the DL message, the UE 102 can recognize that the set of {SUCI} generated based on the previous public key PKnw is outdated. The UE 102, at 570, can derive a new set of encryption keys $\{K_{AES}'\}$ based on the updated public key PKnw' and on a set of unused and/or new ephemeral UE secret keys {eSKue}. In some embodiments, the UE 102 generates a new set of ephemeral UE secret keys {eSKue'} and associated ephemeral UE public keys {ePKue'} and generates the new set of encryption keys $\{K_{AES}'\}$ based on the new set of ephemeral UE secret keys {eSKus'} and the updated public key PKnw'. At 572, the UE 102 discards unused SUCI from the previously generated set of {SUCI} and pre-generates a new set of {SUCI'} using the new set of encryption keys $\{K_{AES}'\}$. At 574, the UE 102 sends a new UL message that includes a new encrypted subscription identifier SUCI' along with the associated ephemeral UE public key ePKue' and an identifier PKnw' ID for the updated public key PKnw'. The new UL message sent at 574 allows the UE 102 to retry performing an action, such as authentication with the cellular wireless network entity 550, that previously failed based on an expired network public key PKnw. At 576, the cellular wireless network entity 550 validates the public key PKnw' used for the UE 102 based on the identifier PKnw' ID obtained from the UL message, and when validated, derives the encryption key $K_{AES}'$ using the ephemeral UE public key ePKue' included in the UL message and the currently valid secret network key SKnw' associated with the public key PKnw'. The cellular wireless network entity 550 decrypts the SUCI' from the UL message using the derived encryption key $K_{AES}'$ to obtain the unencrypted subscription identifier SUPI.

In some embodiments, a network public key PKnw is associated with an eSIM 208 provided by a cellular wireless network entity, such as by a provisioning server 116 associated with an MNO 114, or by another network-based server. The eSIM network public key PKnw can be stored in memory of the eUICC 108 of the UE 102 and can be updated by communication from the MNO 114 via the provisioning server 116 or another network-based server directly to the eUICC 108 of the UE 102. The copy of the network public key PKnw maintained by the eUICC 108 of the UE 102 can be referred to as the eSIM PKnw. In some embodiments, each eSIM 208 can have its own associated network public key eSIM PKnw. In some embodiments, a set of eSIMs 208 associated with a common MNO 114 can have an associated eSIM PKnw. In some embodiments, processing circuitry of the eUICC 108 generates encryption keys $\{K_{AES}\}$ and encrypts the SUPI to form a set of {SUCI}. Generally, the processing circuitry external to the eUICC 108 of the UE 102 has superior computing capability to the limited processing capability of processing circuitry of the eUICC 108, and therefore, in some embodiments, calculation of the encryption keys $\{K_{AES}\}$ and encryption of the SUPI to form the set of {SUCI} can be offloaded to the processing circuitry external to the eUICC 108, e.g., to the processor 104. The processing circuitry external to the eUICC 108, e.g., the processor 104, can maintain its own copy of a network public key for an associated eSIM 208 (or set of eSIMs 208 for a common MNO 114), and the copy can be referred to as the processor PKnw. In some embodiments, the processor 104 synchronizes the processor PKnw with the eSIM PKnw maintained by the eUICC 108.

Initial network public keys and updates to network public keys can be provided to the UE 102 through different mechanisms. In some embodiments, a cellular wireless network entity updates a network public key maintained by a secure element (SE), e.g., the eUICC 108, of the UE by sending an OTA update to the SE. In some embodiments, a third-party server provides a carrier bundle update to the processing circuitry external to the SE of the UE, e.g., to the processor 104, the carrier bundle update including one or more updated network public keys for one or more cellular wireless networks. As the processing circuitry external to the eUICC 108 can maintain network public keys separately from internal processing circuitry of the eUICC 108, the UE 102 can cross check the network public keys maintained by each and update or select between the separately maintained network public keys according to a device policy and/or a network policy. Updates provided by carrier wireless network directly to the eUICC 108 may be not known by the processing circuitry external to the eUICC 108 until being informed of an update by the eUICC 108 or by querying the eUICC 108.

Figure 6A:
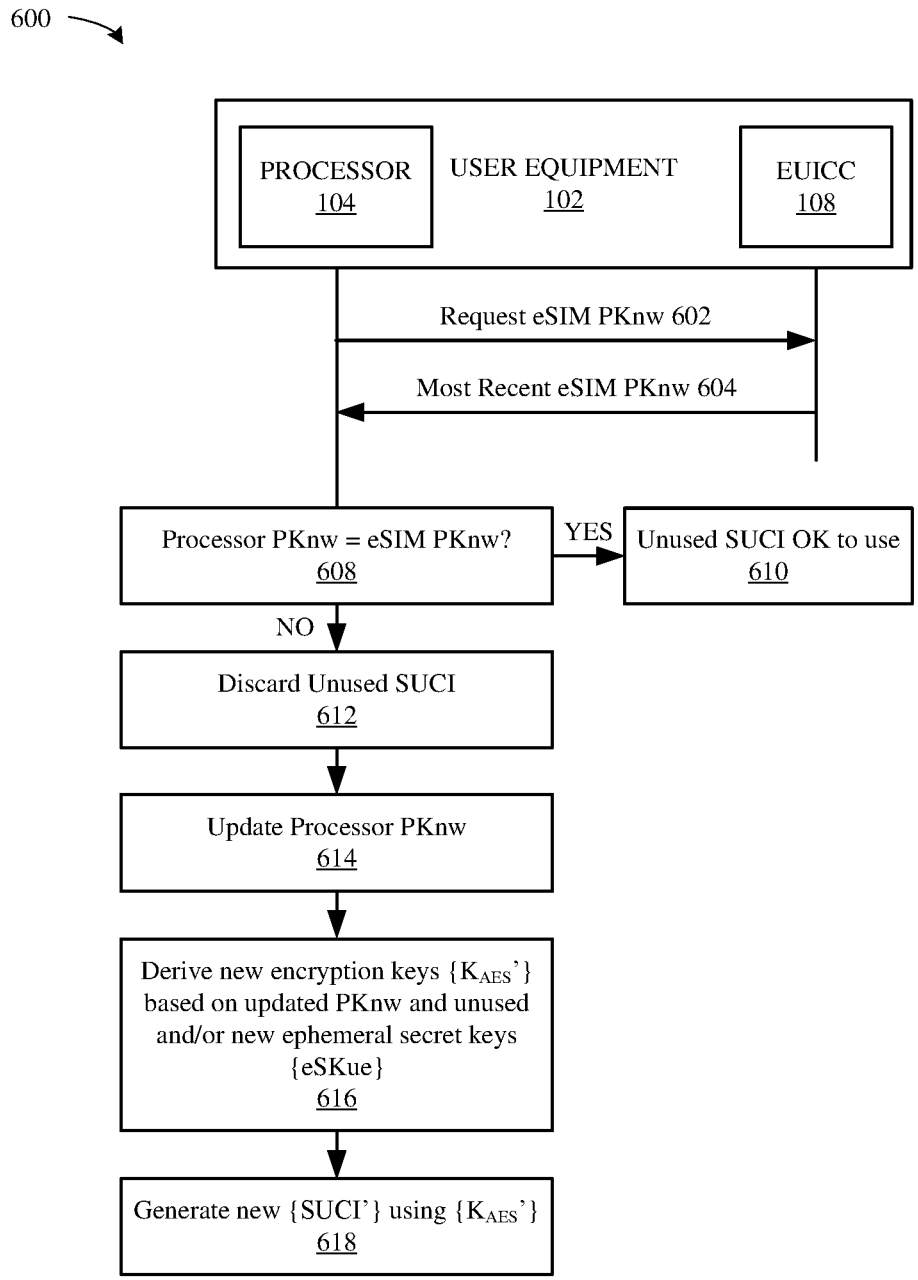
FIGS. 6A and 6B illustrate updating encrypted subscriber identities based on an updated network key, according to some embodiments.

FIG. 6A illustrates a diagram 600 in which processing circuitry of the UE 102 external to the eUICC 108 updates encrypted subscription identities, e.g., {SUCI}, based on checking for updates a network public key maintained by the eUICC 108, e.g., the eSIM PKnw. At 602, the processor 104 requests from the eUICC 108 the current eSIM PKnw maintained by the eUICC 108 for an eSIM 208 (or for a set of eSIMs 208 for a common MNO 114). At 604, the eUICC 108 provides an indication of the most recent eSIM PKnw to the processor 104. At 608, the processor determines whether the processor PKnw matches the eSIM PKnw. When the processor PKnw matches the eSIM PKnw, at 610, the processor 104 can continue to keep and use any unused SUCI from the set of {SUCI} generated with the processor PKnw. When the processor PKnw does not match the eSIM PKnw, at 612, the processor 104 can discard any unused SUIC from the set of {SUCI} generated with the processor PKnw. At 614, the processor 104, can update the processor PKnw based on the eSIM PKnw provided by the eUICC 108. At 616, the processor 104 can derive a new set of encryption keys $\{K_{AES}'\}$ based on the updated PKnw and on any previously generated, unused ephemeral secret keys {eSKue} and/or based on new ephemeral secret keys. In some embodiments, the processor 104 generates a new set of ephemeral key pairs {ePKue', eSKue'} and uses the newly generated ephemeral secret keys {eSKue'} along with the updated PKnw to generate the new set of encryption keys $\{K_{AES}'\}$. At 618, the processor 104 generates a new set of encrypted subscription identifiers {SUCI'} by encrypting the SUPI using the new set of encryption keys $\{K_{AES}'\}$.

Figure 6B:
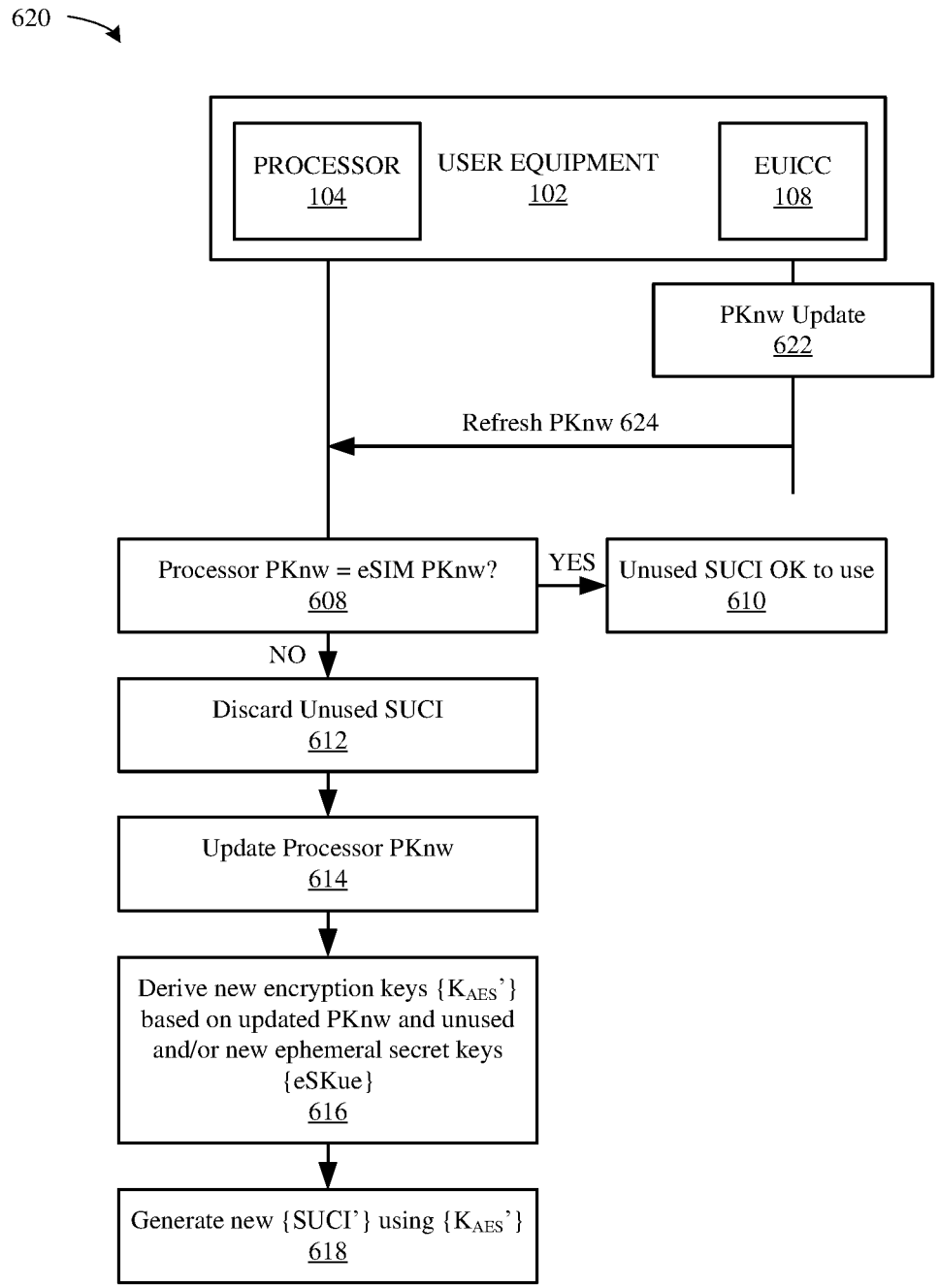

FIG. 6B illustrates a diagram 620 in which processing circuitry of the UE 102 external to the eUICC 108 updates encrypted subscription identities, e.g., {SUCI}, in response to receipt of an update of the network public key maintained by the eUICC 108, e.g., the eSIM PKnw. At 622, the eUICC 108 updates the eSIM PKnw maintained at the eUICC 108, e.g., based on a message received from a network-based server, such as the provisioning server 116 associated with an MNO 114. The eUICC 108 can proactively send a message to the processing circuitry external to the eUICC 108, to the processor 104, at 624, the message providing an update to the eSIM PKnw. The processor 104 can proceed as in FIG. 6A at 608 to check whether the processor PKnw matches the eSIM PKnw provided by the eUICC 108. When the processor PKnw matches the eSIM PKnw, at 610, the processor 104 can continue to keep and use any unused SUCI from the set of {SUCI} generated with the processor PKnw. When the processor PKnw does not match the eSIM PKnw, at 612, the processor 104 can discard any unused SUIC from the set of {SUCI} generated with the processor PKnw. At 614, the processor 104, can update the processor PKnw based on the eSIM PKnw provided by the eUICC 108. At 616, the processor 104 can derive a new set of encryption keys $\{K_{AES}'\}$ based on the updated PKnw and on any previously generated, unused ephemeral secret keys {eSKue} and/or using new ephemeral secret keys. In some embodiments, the processor 104 generates a new set of ephemeral key pairs {ePKue', eSKue'} and uses the newly generated ephemeral secret keys {eSKue'} along with the updated PKnw to generate the new set of encryption keys $\{K_{AES}'\}$. At 618, the processor 104 generates a new set of encrypted subscription identifiers {SUCI'} by encrypting the SUPI using the new set of encryption keys $\{K_{AES}'\}$.

Figure 7:
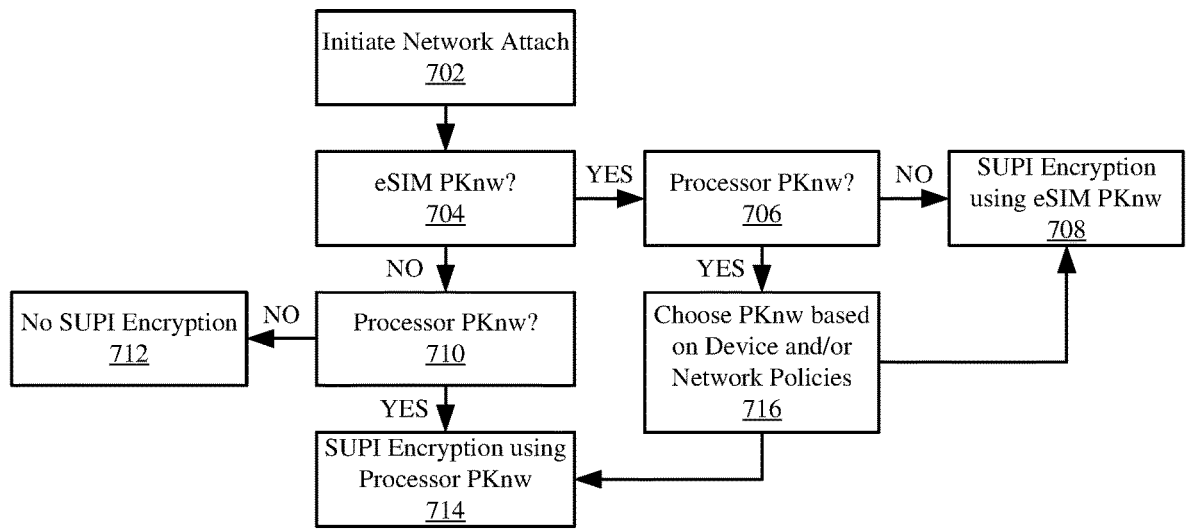
FIG. 7 illustrates an example of network key management and subscriber identity encryption, according to some embodiments.

FIG. 7 illustrates a diagram 700 of an exemplary network key management process to determine whether to encrypt a subscription identity, e.g., the SUPI, and if so, using what parameters to encrypt the subscription identity to form an encrypted subscription identity, e.g., the SUCI. Network public keys {PKnw} can be provided by MNO based servers, such as the provisioning server 116, or by another cellular wireless network entity a to secure element (SE) of the UE 102, e.g., the eUICC 108 or a physical UICC that includes a SIM for the MNO 114. Additionally, in some embodiments, a carrier bundle can be provided by a third-party server to processing circuitry external to the SE, e.g., to the processor 104 of the UE 102. The carrier bundle can include one or more network public keys for one or more MNOs 114. The carrier bundle can be signed by a certificate to allow the UE 102 to check that the carrier bundle is provided by a valid server that can be trusted by the UE 102. The third-party server can obtain applicable network public keys from MNOs 114 via business channels used to provide other network software updates. When encryption of the subscription identifier, e.g., the SUPI, is performed by processing circuity external to the eUICC 108, the processing circuitry can determine an applicable network public key to use for generating encryption keys to encrypt the SUPI to form the SUCI. In some embodiments, the processing circuitry selects a network public key based on a public land mobile network (PLMN) on which the UE 102 is camped. In some embodiments, the processing circuity of the UE 102 selects between one or more public network keys maintained by the processing circuitry external to the eUICC 108 and one or more public network keys maintained by the eUICC 108.

At 702, the UE 102 can initiate an attachment to a cellular wireless network. At 704, the UE 102 can determine whether an eUICC 108 maintains an eSIM public network key PKnw for an eSIM 208 stored by the eUICC 108, where the eSIM 208 includes credentials for accessing the cellular wireless network to which the UE 102 seeks to attach. When the eUICC 108 does not include an eSIM public network key PKnw for the eSIM 208, at 710, the UE 102 can determine whether processing circuitry external to the eUICC 108 maintains a processor public network PKnw for the eSIM 208. When there is no eSIM PKnw maintained by the eUICC 108 and no processor PKnw maintained by processing circuitry external to the eUICC 108, the UE 102, at 712, can proceed to use an unencrypted version of a subscription identifier, e.g., the SUPI, for one or more messages to communicate with the cellular wireless network. When there is no eSIM PKnw maintained by the eUICC 108 but there is a processor PKnw maintained by processing circuitry external to the eUICC 108, at 714, the UE 102 can use an encrypted version of the SUPI, e.g., a SUCI, for communication with the cellular wireless network. In some embodiments, encryption of the SUPI to form the SUCI is performed during the network attach process, while in other embodiments, encryption of the SUPI to form the SUCI can occur in the past, e.g., pre-generated by the UE 102, and the UE 102 can retrieve a pre-generated SUCI for use in a message for communication with the cellular wireless network. When the eUICC 108 does include an eSIM public network key PKnw for the eSIM 208, at 706, the UE 102 can determine whether processing circuitry external to the eUICC 108 also maintains a processor public network PKnw for the eSIM 208. When the UE 102 does not maintain a processor PKnw by the processing circuitry external to the eUICC 108 but does maintain an eSIM PKnw by the eUICC 108, the UE 102, at 708 can encrypt the SUPI using the eSIM PKnw. In some embodiments, encryption of the SUPI to form a set of encrypted subscription identities {SUCI} is performed by processing circuitry of the eUICC 108. In some embodiments, encryption of the SUPI is performed by processing circuitry of the UE 102 external to the eUICC 108, e.g., by the processor 104. In some embodiments, encryption of the SUPI to form the set of {SUCI} occurs in advance of initiation of the network attachment procedure. When the UE 102 maintains both a processor PKnw and an eSIM PKnw, at 716, the UE 102 can choose which PKnw to use for encryption of the SUPI based on a device policy and/or based on a network policy. In some embodiments, a network policy can require that the eSIM PKnw (when available) has priority for encryption over the processor PKnw. In some embodiments, a network policy and/or a device policy can use a time stamp and/or a revision number of the processor PKnw and the eSIM PKnw to determine which of the PKnw and the eSIM PKnw is most recent (up-to-date) and therefore to be used for encryption of the SUPI to form the set of {SUCI}. In some embodiments, the device-based policy and/or the network-based policy can require attempting to use available network public keys maintained by the SE or by the processing circuitry external to the SE until a SUCI encrypted with one of the network public keys is accepted by the wireless network or all network public keys have been attempted. In some embodiments, the device-based policy and/or the network-based policy can require sending an unencrypted SUPI rather than an encrypted SUCI to the wireless network when no network public keys are available or when no available network public key enables successful authentication with the wireless network.

Figure 8:
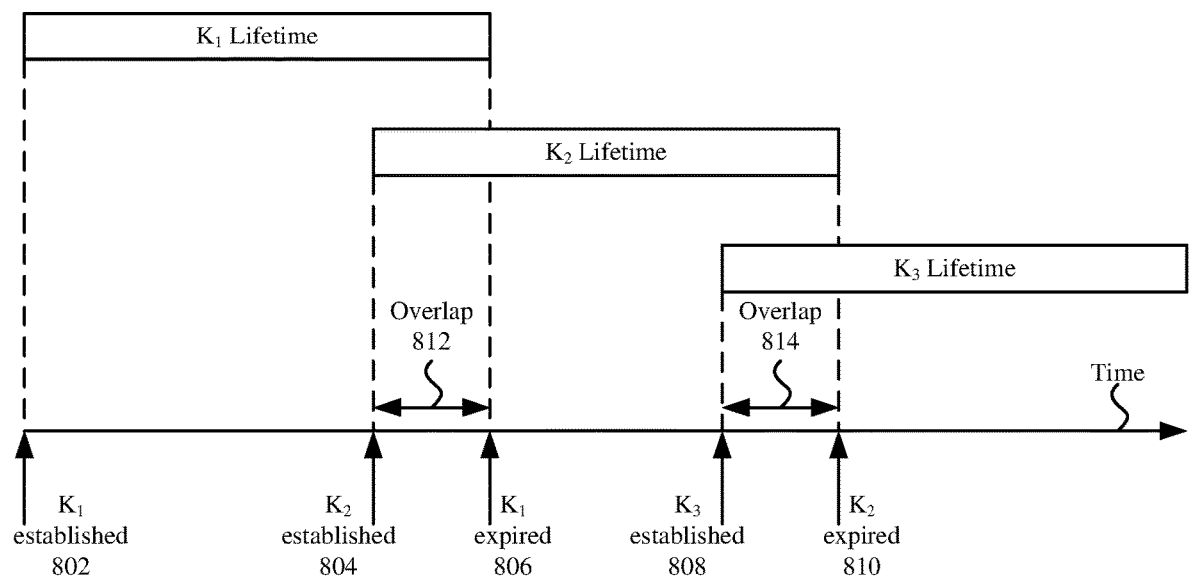
FIG. 8 illustrates a block diagram of an example of overlapping time periods for the use of network keys.

FIG. 8 illustrates a block diagram 800 of an example of overlapping time periods for the use of a public network key PKnw. At a time indicated by 802, a first public network key K1 is established for use over a time period indicated as the K1 lifetime. When changing between different public network keys, such as when updating the public network key K1 to K2, a lifetime of a previous public network key can overlap with a lifetime of a newest public network key. For example, at a time indicated by 804, the second public network key K2 is established for use over a time period indicated as the K2 lifetime. As indicated in FIG. 8, the K1 and K2 lifetimes span an overlapping time period 812, where both the first key K1 and the second key K2 can be validly used before the first key K1 expires at time 806. The overlap allows for a variable time that the UE 102 can use to switch from using the first key K1 to using the second key K2. Similarly, when a third key K3 is established at time 808, the lifetime of the third key K3 overlaps for the time period 814 until expiration of the second key K2 at time 810. In some embodiments, network key pairs can be updated by the cellular wireless network entity 550, using an over-the-air (OTA) secure connection between the cellular wireless network entity 550 and the UE 102. Similarly, in some embodiments, network key pairs can overlap in time to allow for unplanned interruptions of transfer of an updated network public key from the cellular wireless network entity 550 to the UE 102 and for delays in updating the network public key at the UE 102. Robust key rotation can be achieved by keeping both old and new keys live (e.g., valid for use by the UE 102) during overlapping lifetimes. As discussed herein, some UL messages from the UE 102 can include a key ID to indicate which network public key was used by the UE 102 when deriving the encryption key with which the mobile subscriber identifier, such as the MSIN of an IMSI of the UE 102, was encrypted to form the SUCI from the SUPI.

Figure 9A:
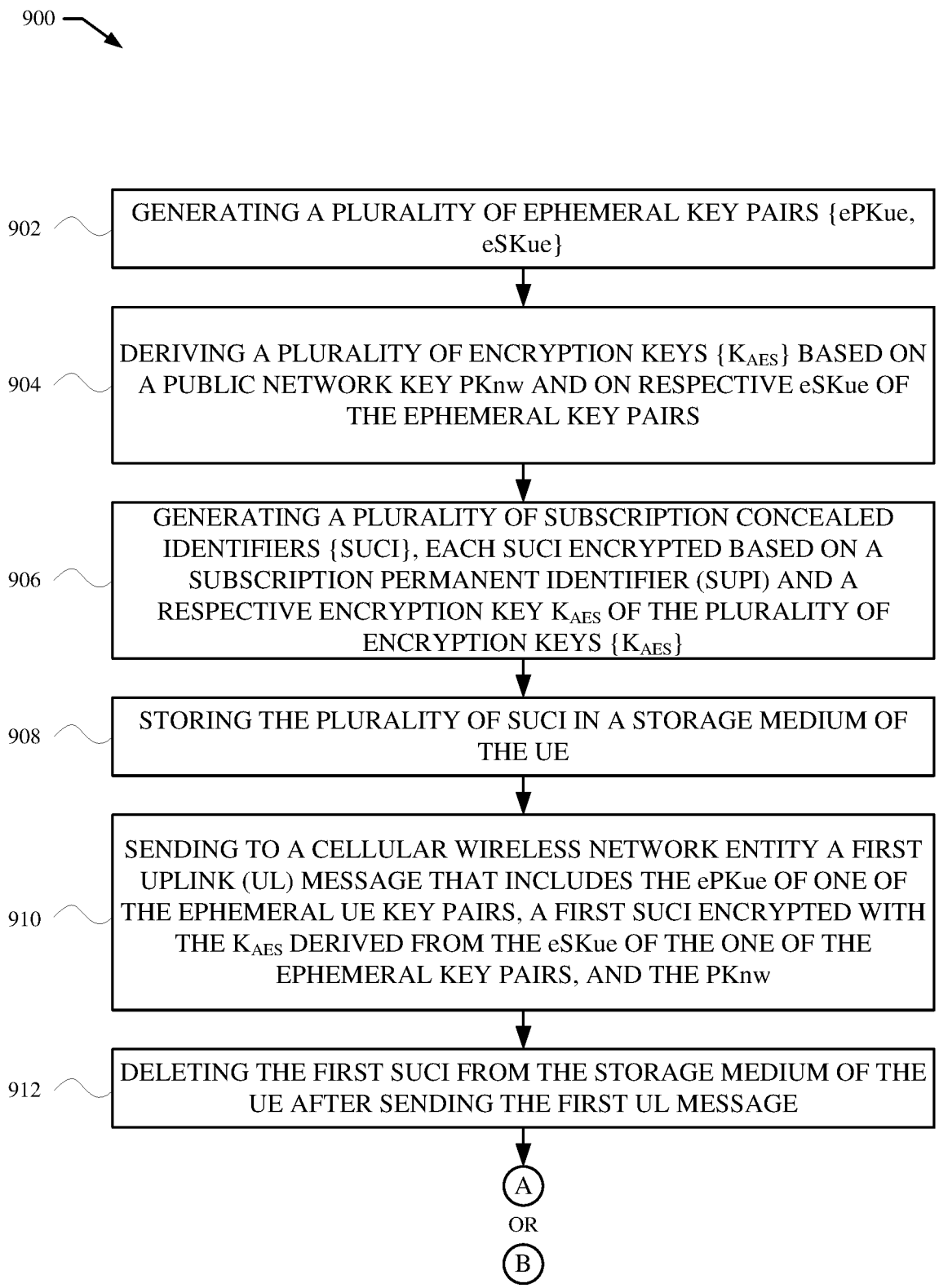
FIGS. 9A, 9B, and 9C illustrate exemplary flow diagrams of actions performed by a UE to implement a method to protect the privacy of a subscriber identity, according to some embodiments.

FIG. 9A illustrates a flow diagram 900 of an exemplary method to protect a subscriber identity implemented by a UE 102, according to some embodiments. At 902, the UE generates multiple ephemeral key pairs {ePKue, eSKue}, each ephemeral key pair including an ephemeral UE public key (ePKue) and an ephemeral UE secret key (eSKue). Each ephemeral key pair can be used to encrypt a subscriber identity, such as a subscription permanent identifier (SUPI) to form a subscription concealed identifier (SUCI). The SUCI can be used once for a message communicated to a wireless network, such as during authentication of the UE 102 with a wireless network entity of the wireless network. Authentication of the UE 102 can be required to attach to a wireless network and also can be used during a location area update, as well as for other procedures as required by a network policy of the wireless network. At 904, the UE derives a set of multiple encryption keys $\{K_{AES}\}$, where each encryption key $K_{AES}$ can be based on a public network key (PKnw) for a cellular wireless network, such as for a home public land mobile network (HPLMN), and on a respective one of the ephemeral UE secret keys of the ephemeral key pairs {ePKue, eSKue}. The UE 102 can obtain the PKnw in advance of deriving the encryption keys $\{K_{AES}\}$, such as from a provisioning server 116, from another network-based server for an MNO 114, or from a third-party server. In some embodiments, the third-party server provides a carrier bundle update that includes a current PKnw for one or more cellular wireless networks and/or MNOs 114. In some embodiments, the PKnw is updated over time, such as through a carrier update provided directly to the UE by a server maintained by the MNO 114 and/or via the third-party server. In some embodiments, the UE 102 discards the ephemeral secret keys {eSKue} after deriving the encryption keys $\{K_{AES}\}$. In some embodiments, the UE 102 discards a particular ephemeral secret key (eSKue) associated with a particular encryption key $K_{AES}$ when an encrypted subscriber identity, e.g., a SUCI encrypted with the particular $K_{AES}$, has been used in a message sent to a cellular wireless network. At 906, the UE 102 generates a set of multiple subscription concealed identifiers {SUCI}, each SUCI encrypted based on a subscription permanent identifier (SUPI) and a respective encryption key $K_{AES}$ of the set of multiple encryption keys $\{K_{AES}\}$. At 908, the UE 102 stores the set of multiple SUCI in a storage medium of the UE 102. In some embodiments, generation of the SUCI is performed by processing circuitry external to the eUICC 108, e.g., by processor 104, and stored in memory external to the eUICC 108, e.g., in memory 106. In some embodiments, generation of the SUCI is performed by processing circuity of the eUICC 108 and stored in memory of the eUICC 108. At 910, the UE 102 sends a first uplink (UL) message to a cellular wireless network entity, the first UL message including the ePKue of one of the ephemeral UE key pairs {ePKue, eSKue}, a first USCI encrypted with the encryption key $K_{AES}$ derived from the eSKue of the one of the ephemeral key pairs {ePKue, eSKue}, and the network public key PKnw. At 912, the UE 102 deletes the first SUCI from the storage medium of the UE 102 after sending the first UL message to the cellular wireless network entity. In some embodiments, the UE 102 continues the method based on additional actions outlined in FIG. 9B and/or in FIG. 9C.

Figure 9B:
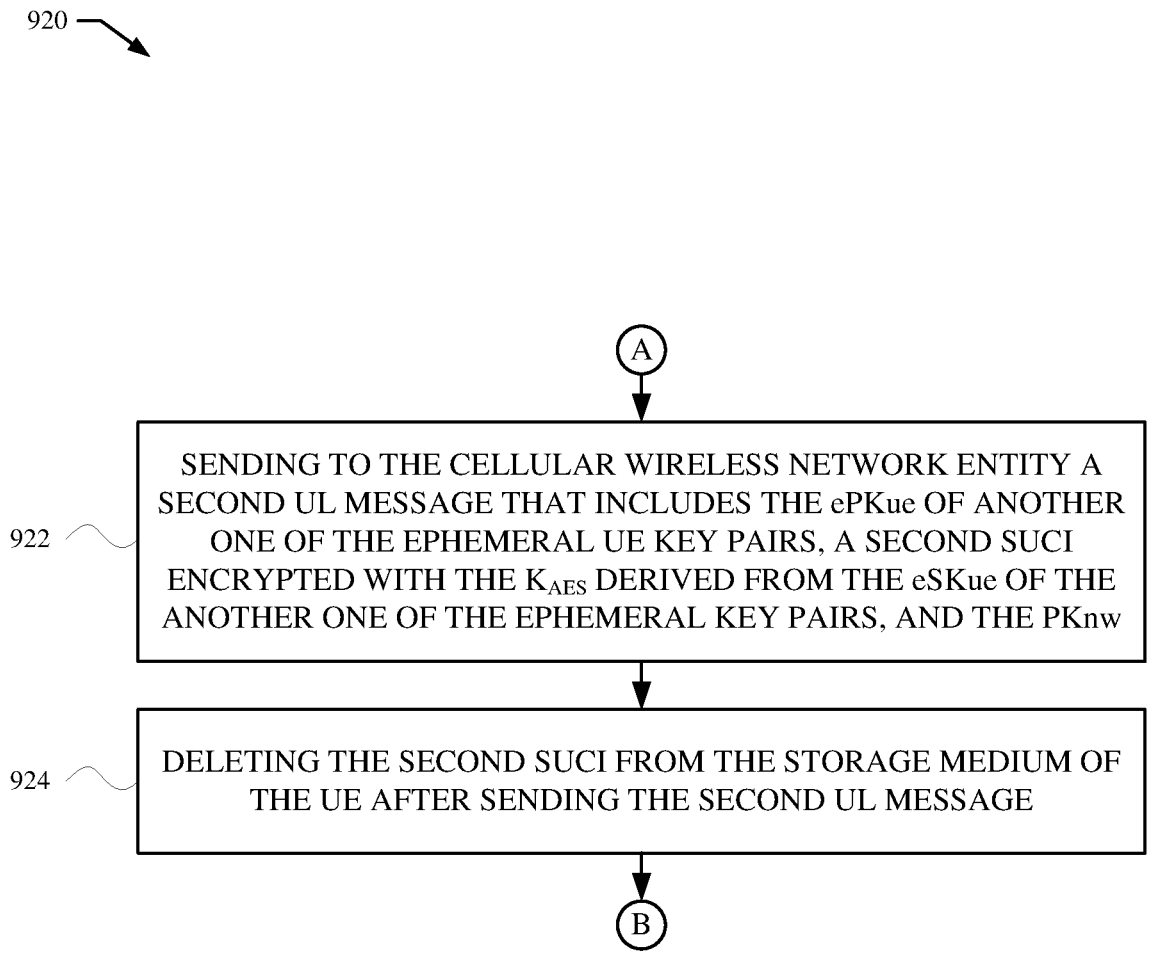

FIG. 9B illustrates a flow diagram 920 of additional actions that can follow the actions illustrated in the flow diagram 900 of FIG. 9A to protect a subscriber identity, the actions performed by the UE 102, according to some embodiments. At 922, the UE 102 sends to the cellular wireless network entity a second UL message that includes the ePKue of another one of the ephemeral key pairs {ePKue, eSKue}, a second SUCI encrypted with the $K_{AES}$ derived from the eSKue of the another one of the ephemeral UE key pairs {ePKue, eSKue}, and the network public key PKnw. At 923, the UE 102 deletes the second SUCI from the storage medium of the UE 102 after sending the second UL message to the cellular wireless network entity. The first SUCI and the second SUCI can each be encrypted with a different ephemeral UE secret key eSKue but with the same network public key PKnw. As discussed herein, the SUCI can be used once per message communicated to a wireless network and discarded after use.

Figure 9C:
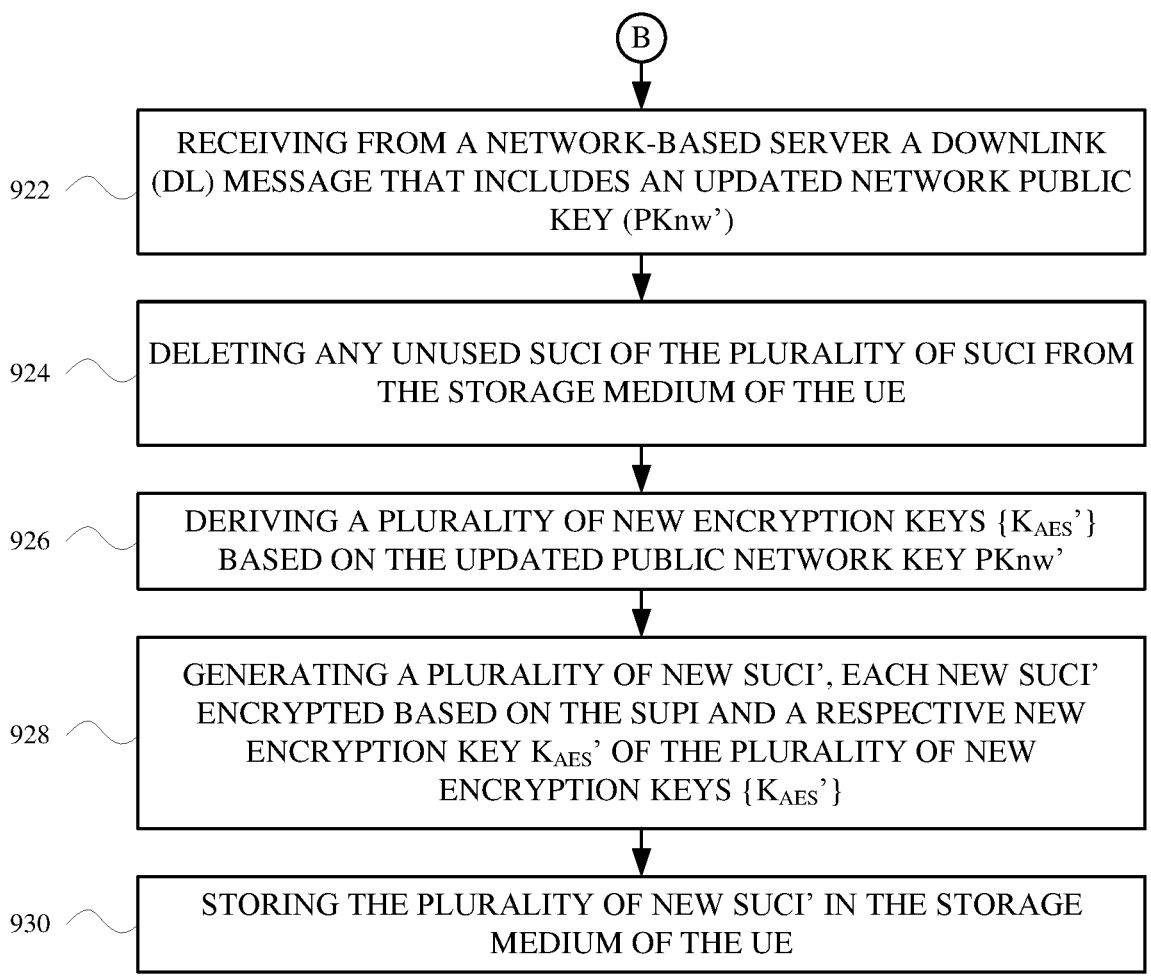

FIG. 9C illustrates a flow diagram 940 of additional actions that can follow the actions illustrated in the flow diagram 900 of FIG. 9A to protect a subscriber identity, the actions performed by the UE 102, according to some embodiments. At 922, the UE 102 receives from a network-based server, e.g., the cellular wireless network entity, the provisioning server 116, or a third-party server, a downlink (DL) message that includes an updated network public key (PKnw'). At 924, the UE 102 deletes any unused SUCI of the set of multiple SUCI from the storage medium of the UE 102. In some embodiments, the UE 102 checks the updated network public key PKnw' against the previous network public key PKnw used to generated the multiple SUCI and if the updated network public key PKnw' is the same as the previous network public key PKnw, the set of multiple SUCI can continue to be used and not discarded. At 926, the UE 102 derives a new set of multiple encryption keys {$K_{AES}'$} based on the updated network public key PKnw'. In some embodiments, the UE 102 generates a new set of ephemeral UE key pairs {ePKue', eSKue'} and derives the new set of multiple encryption keys {$K_{AES}'$} using the newly generated ephemeral UE secret keys {eSKue'}. In some embodiments, the UE 102 uses previously generated ephemeral UE key pairs {ePKue, eSKue} from any unused SUCI, e.g., for which no message including the unused SUCI had been sent to the cellular wireless network. At 928, the UE 102 generates a set of multiple new SUCI', each new SUCI' encrypted based on the SUPI and a respective new encryption key $K_{AES}'$ of the set of multiple encryption keys {$K_{AES}'$}. At 930, the UE 102 stores the set of multiple new SUCI' in the storage medium of the UE 102.

In some embodiments, the DL message, which included the updated network public key PKnw', includes a carrier bundle update for multiple mobile network operators (MNOs) 114, where the PKnw' is the updated network public key for a wireless network of at least one of the MNOs 114. In some embodiments, the DL message is processed by processing circuitry of the UE 102 external to the eUICC 108 of the UE 102. In some embodiments, the network-based server from which the UE 102 receives the DL message is a third-party server maintained by an entity other than the MNOs 114. In some embodiments, the DL message is an over-the-air (OTA) update from a provisioning server 116 of an MNO 114, and the DL message is provided to the eUICC 108 or to a physical SIM card (e.g., a UICC) of the UE 102. In some embodiments, at least one of the new encryption keys $K_{AES}'$ is based on an ephemeral UE secret key (eSKue) that corresponds to one of the unused SUCIs. In some embodiments, at least one of the new encryption keys $K_{AES}'$ is based on a newly generated ephemeral UE secret key (eSKue'). In some embodiments, the first UL message sent by the UE 102 to the cellular wireless network entity includes a key identifier (ID) that indicates to the cellular wireless network entity which public network key PKnw that the UE used to derive the encryption key $K_{AES}$ used to encrypt the SUPI to form the SUCI included in the first UL message. In some embodiments, the key ID is the PKnw, a hash of the PKnw, or a count value. In some embodiments, the cellular wireless network entity is an evolved NodeB (eNodeB) or a next generation NodeB (gNB). In some embodiments, the SUPI is an International Mobile Subscriber Identity (IMSI), and the SUCI is an encrypted version of a mobile subscriber identification number (MSIN) of the IMSI.

Figure 10:
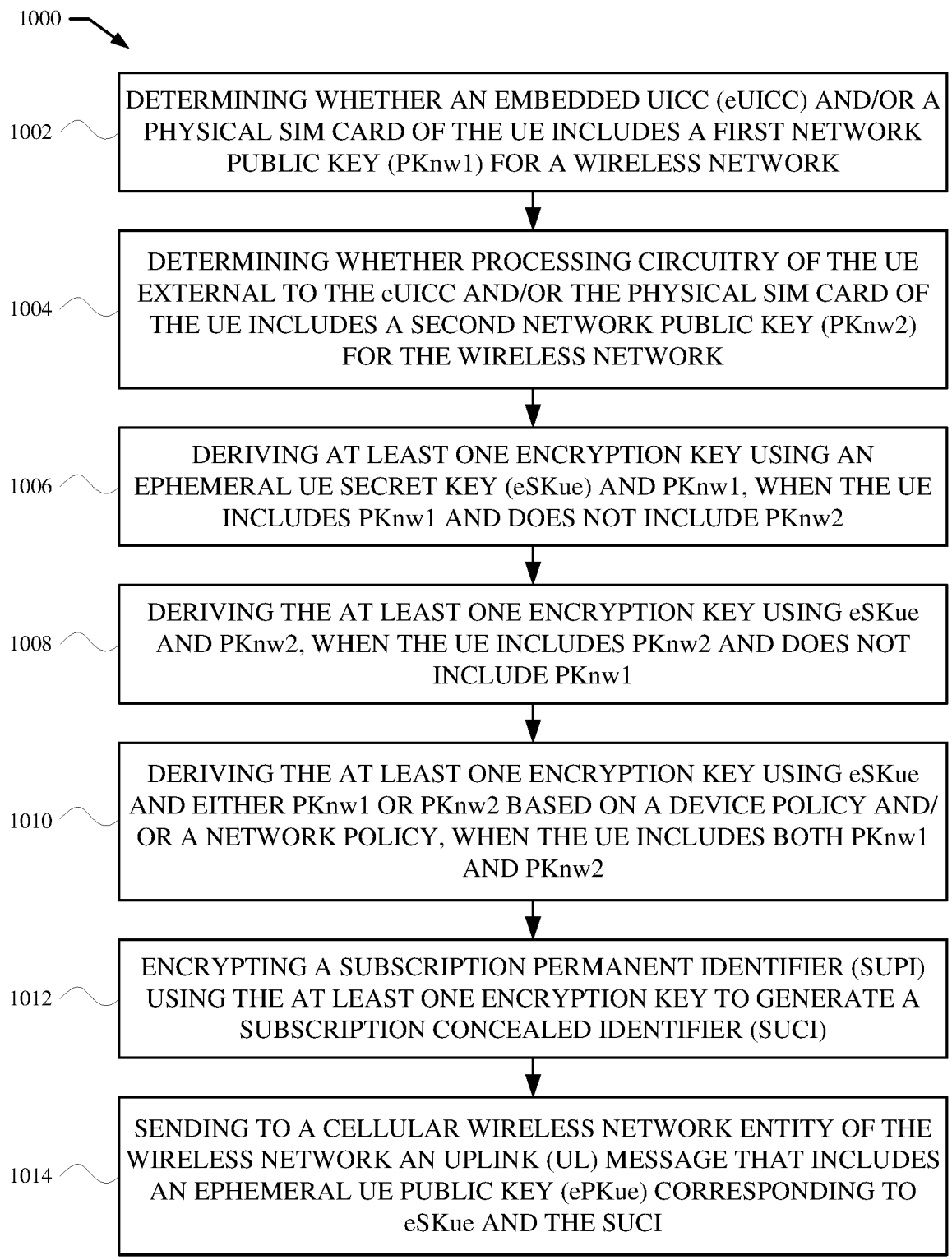
FIG. 10 illustrates an exemplary flow diagram of actions performed by a UE to implement another method to protect the privacy of a subscriber identity, according to some embodiments.

FIG. 10 illustrates a flow diagram 1000 of another exemplary method to protect a subscriber identity implemented by a UE 102, according to some embodiments. The actions illustrated in FIG. 10 can be used by the UE 102 to determine whether to encrypt a subscriber identity, e.g., the SUPI, and when encryption occurs to determine which public network key (PKnw) to use. In some embodiments, the UE 102 maintains one or more public network keys on processing circuitry external to the eUICC 108 (or external to a SIM card or UICC of the UE 102). In some embodiments, the UE 102 maintains one or more public network keys on the eUICC 108 (or on a SIM card or UICC of the UE 102). In some embodiments, the UE 102 using public network keys to encrypt the SUCI using processing circuitry external to the eUICC 108 (or external to a SIM card or UICC of the UE 102), the processing circuitry configured to determine which of several public network keys to use, e.g., when public network keys are stored on (i) the processing circuitry external to the eUICC 108 (or external to the SIM card or UICC of the UE 102), or on (ii) the eUICC 108 (or the SIM card or UICC of the UE 102), or on both. In some embodiments, choosing between public network keys to use for encryption of a subscriber identity, e.g., of the SUPI, can be based on a device policy and/or based on a network policy.

At 1002, the UE 102 determines whether the eUICC 108 (and/or a SIM card or UICC of the UE 102) includes a first network public key (PKnw1) for a wireless network. At 1004, the UE 102 determines whether processing circuitry of the UE 102 external to the eUICC 108 (and/or external to a SIM card or UICC of the UE 102) includes a second network public key (PKnw2) for the wireless network. At 1006, the UE 102 derives at least one encryption key using an ephemeral UE secret key (eSKue) and PKnw1, when the UE 102 includes PKnw1 and does not include PKnw2. At 1008, the UE 102 derives the at least one encryption key using eSKue and PKnw2, when the UE 102 includes PKnw2 and does not includes PKnw1. At 1010, the UE 102 derives at least one encryption key using eSKue and either PKnw1 or PKnw2 based on a device policy and/or based on a network policy, when the UE 102 includes both PKnw1 and PKnw2. At 1012, the UE 102 encrypts a SUPI using the at least one encryption key to generate a SUCI. At 1014, the UE 102 sends to a cellular wireless network entity of the wireless network a UL message that includes an ephemeral UE public key (ePKue) that corresponds to eSKue and the SUCI.

In some embodiments, the device policy and/or the network policy requires that the UE 102 derive the at least one encryption key using PKnw1 when available. In some embodiments, PKnw1 is provided by a network-based server associated with an MNO 114 for the wireless network to which the UE 102 seeks to authenticate using the SUCI. In some embodiments, PKnw1 is provided via a secure connection between a provisioning server 116 (or another server managed by the MNO114) and the eUICC 108 (or the SIM card or UICC of the UE 102). In some embodiments, the device policy and/or the network policy requires the UE 102 to derive the at least one encryption key using a most recent one of PKnw1 or PKnw2. In some embodiments, the UE 102 determines which of PKnw1 or PKnw2 is most recent based on a time stamp, a publication time, a version number, or the like. In some embodiments, the at least one encryption key derived by the UE 102 includes multiple encryption keys, each encryption key based on a unique eSKue from a set of multiple eSKue. In some embodiments, the UE 102 generates a set of multiple SUCI using multiple encryption keys to individually encrypt the SUPI and stores the set of multiple SUCI on a storage medium of the UE 102. Derivation of encryption keys and SUCI can occur in advance of a procedure that requires authentication using the SUCI. In some embodiments, the UE 102 deletes a SUCI from the storage medium of the UE 102 after sending a corresponding UL message that included the SUCI to a cellular wireless network entity. In some embodiments, the UL message sent by the UE 102 includes a key identifier (ID) that indicates to the cellular wireless network entity which public network key of PKnw1 or PKnw2 that the UE 102 used to determine the at least one encryption key. In some embodiments, the key ID is one of: (i) PKnw1 or PKnw2, (ii) a hash of PKnw 1 or PKnw2, or (iii) a count value for PKnw1 or PKnw2. In some embodiments, the at least one encryption key includes an Advanced Encryption Standard (AES) encryption key. In some embodiments, the cellular wireless network entity is an evolved NodeB (eNodeB) or a next generation NodeB (gNB).

In some embodiments, an apparatus configurable for operation in a UE 102 includes comprising a processor and a memory storing instructions that, when executed by the processor, cause the UE to perform one or more methods as described herein. In some embodiment, a UE 102 includes wireless circuitry configurable for wireless communication with a wireless network, and processing circuitry communicatively coupled to the wireless circuitry and including a processor and a memory storing instructions that, when executed by the processor, cause the UE to perform one or more methods as described herein.

Figure 11:
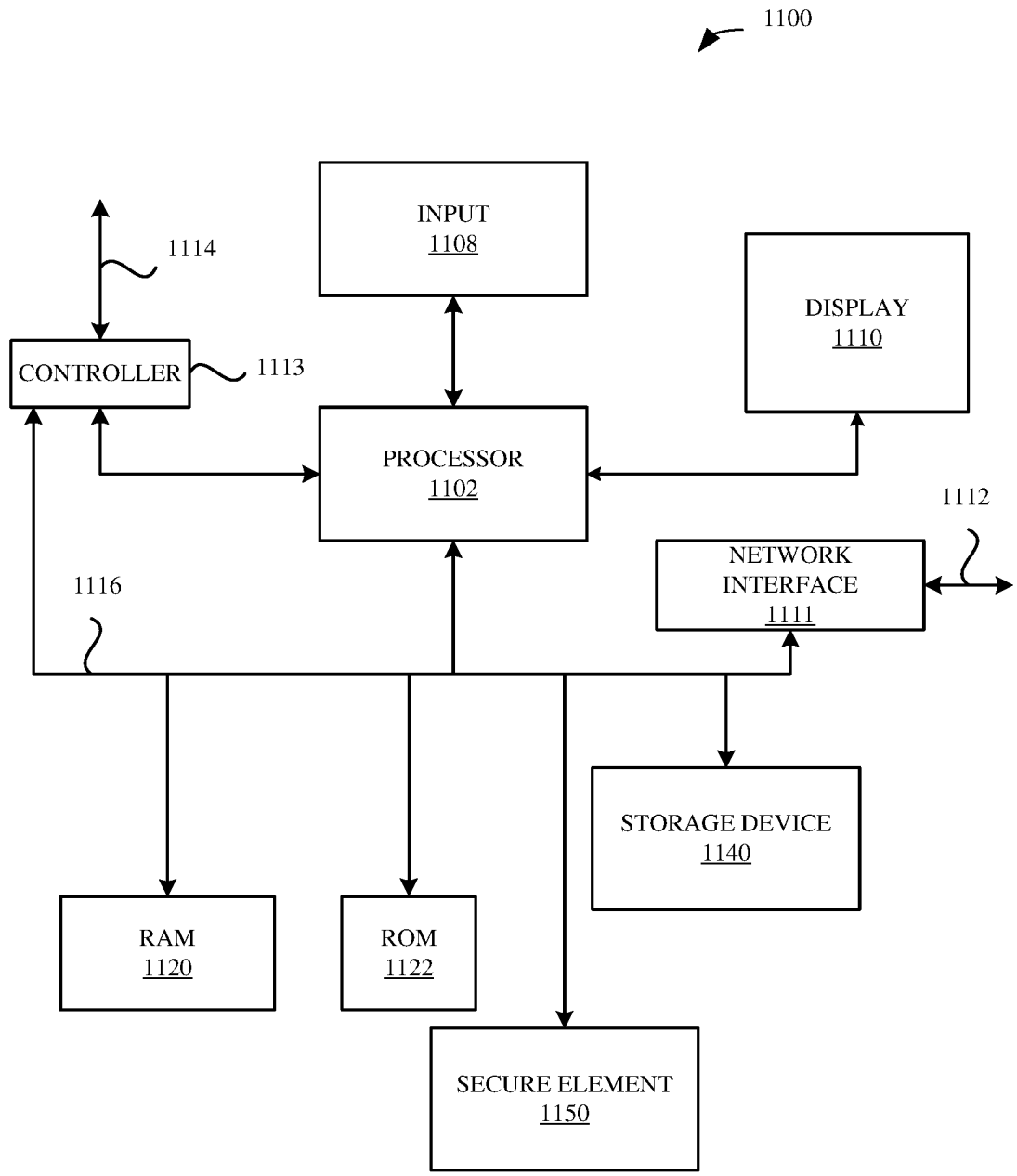
FIG. 11 illustrates a detailed view of a representative computing device that can be used to implement various methods described herein, according to some embodiments.

FIG. 11 illustrates a detailed view of a representative computing device 1100 that can be used to implement various methods described herein, according to some embodiments. In particular, the detailed view illustrates various components that can be included in the UE 102 illustrated in FIG. 1. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to display information to the user. A data bus 1116 can facilitate data transfer between at least a storage device 1140, the processor 1102, and a controller 1113. The controller 1113 can be used to interface with and control different equipment through and equipment control bus 1114. The computing device 1100 can also include a network/bus interface 1111 that couples to a data link 1112. In the case of a wireless connection, the network/bus interface 1111 can include a wireless transceiver.

The computing device 1100 also includes a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100. The computing device 1100 can further include a secure element (SE) 1150, which can represent an eUICC 108, of the UE 102.

The various aspects, embodiments, implementations or features of the described embodiments can be used separately or in any combination. Software, hardware, or a combination of hardware and software can implement various aspects of the described embodiments. The described embodiments can also be embodied as computer readable code on a non-transitory computer readable medium. The non-transitory computer readable medium is any data storage device that can store data, which can thereafter be read by a computer system. Examples of the non-transitory computer readable medium include read-only memory, random-access memory, CD-ROMs, DVDs, magnetic tape, hard disk drives, solid state drives, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for protecting privacy of a subscriber identity included in a user equipment (UE), the method comprising:
by the UE:
generating a plurality of ephemeral UE key pairs, each ephemeral UE key pair including an ephemeral UE public key (ePKue) and an ephemeral UE secret key (eSKue);
deriving a plurality of encryption keys, each encryption key $K_{AES}$ based on a public network key (PKnw) and a respective eSKue of one of the ephemeral UE key pairs;
generating a plurality of subscription concealed identifiers (SUCIs), each subscription concealed identifier (SUCI) encrypted based on a subscription permanent identifier (SUPI) and a respective encryption key $K_{AES}$ of the plurality of encryption keys;
storing the plurality of SUCIs in a storage medium of the UE;

sending to a cellular wireless network entity a first uplink (UL) message that includes the ePKue of one of the ephemeral UE key pairs, a first SUCI encrypted with the $K_{AES}$ derived from the eSKue of the one of the ephemeral UE key pairs, and the PKnw; and deleting the first SUCI from the storage medium of the UE after sending the first UL message.

2. The method of claim 1, further comprising:
by the UE:
sending to the cellular wireless network entity a second UL message that includes the ePKue of another one of the ephemeral UE key pairs, a second SUCI encrypted with the $K_{AES}$ derived from the eSKue of the another one of the ephemeral UE key pairs, and the PKnw; and deleting the second SUCI from the storage medium of the UE after sending the second UL message.

3. The method of claim 1, further comprising:
by the UE:
receiving from a network-based server a downlink (DL) message that includes an updated network public key (PKnw');

deleting any unused SUCI of the plurality of SUCIs from the storage medium of the UE;

deriving a plurality of new encryption keys, each new encryption key $K_{AES}'$ based on the updated public network key PKnw';

generating a plurality of new SUCI's, each new SUCI' encrypted based on the SUPI and a respective new encryption key $K_{AES}'$ of the plurality of new encryption keys; and storing the plurality of new SUCI' in the storage medium of the UE.

4. The method of claim 3, wherein the DL message comprises a carrier bundle update for a plurality of mobile network operators (MNOs) including the updated PKnw' for a wireless network of at least one of the MNOs, the DL message processed by processing circuitry of the UE external to an embedded Universal Integrated Circuit Card (eUICC) of the UE.

5. The method of claim 4, wherein the network-based server comprises a third-party server maintained by an entity other than the MNOs.

6. The method of claim 4, wherein the DL message comprises an over-the-air (OTA) update from a provisioning server of an MNO, and the DL message is provided to the eUICC or to a physical Subscriber Identity Module (SIM) card of the UE.

7. The method of claim 3, wherein at least one new encryption key $K_{AES}'$ is further based on the eSKue that corresponds to an unused SUCI of the plurality of SUCIs.

8. The method of claim 3, wherein at least one new encryption key $K_{AES}'$ is further based on a newly generated ephemeral UE secret key (eSKue').

9. The method of claim 1, wherein the first UL message further includes a key identifier (ID) that indicates to the cellular wireless network entity which public network key PKnw that the UE used to derive the encryption key $K_{AES}$.

10. The method of claim 9, wherein the key ID comprises PKnw, a hash of PKnw, or a count value.

11. The method of claim 1, wherein the cellular wireless network entity comprises an evolved NodeB (eNodeB) or a next generation NodeB (gNB).

12. The method of claim 1, wherein:
the SUPI comprises an International Mobile Subscriber Identity (IMSI); and
the SUCI comprises an encrypted version of a mobile subscriber identification number (MSIN) of the IMSI.

13. A method for protecting privacy of a subscriber identity included in a user equipment (UE) during an attachment procedure with a wireless network, the method comprising:
by the UE:
determining whether an embedded Universal Integrated Circuit Card (eUICC) and/or a physical Subscriber Identity Module (SIM) card of the UE includes a first network public key (PKnw1) for the wireless network;

determining whether processing circuitry of the UE external to the eUICC and/or the physical SIM card of the UE includes a second network public key (PKnw2) for the wireless network;

when the UE includes PKnw1 and does not include PKnw2, deriving at least one encryption key using an ephemeral UE secret key (eSKue) and PKnw1;

when the UE includes PKnw2 and does not include PKnw1, deriving the at least one encryption key using eSKue and PKnw2;

when the UE includes both PKnw1 and PKnw2, deriving the at least one encryption key using eSKue and either PKnw1 or PKnw2 based on a device policy and/or a network policy;

encrypting a subscription permanent identifier (SUPI) using the at least one encryption key to generate a subscription concealed identifier (SUCI); and sending to a cellular wireless network entity of the wireless network an uplink (UL) message that includes an ephemeral UE public key (ePKue) corresponding to eSKue and the SUCI.

14. The method of claim 13, wherein the device policy and/or the network policy requires the UE to derive the at least one encryption key using PKnw1 when available.

15. The method of claim 13, wherein the device policy and/or the network policy requires the UE to derive the at least one encryption key using a most recent one of PKnw1 or PKnw2.

16. The method of claim 13, wherein the at least one encryption key comprises a plurality of encryption keys, each encryption key based on a unique eSKue.

17. The method of claim 16, further comprising:
by the UE:
encrypting the SUPI using the plurality of encryption keys to generate a plurality of SUCIs; and
storing the plurality of SUCIs on a storage medium of the UE.

18. The method of claim 17, further comprising the UE deleting the SUCI from the storage medium of the UE after sending the UL message.

19. The method of claim 13, wherein the UL message further includes a key identifier (ID) that indicates to the cellular wireless network entity which public network key of PKnw1 or PKnw2 that the UE used to determine the at least one encryption key.

20. The method of claim 19, the key ID comprises one of: (i) PKnw1 or PKnw2, (ii) a hash of PKnw1 or PKnw2, or (iii) a count value for PKnw1 or PKnw2.

* * * * *